US009323218B2

(12) United States Patent
Tsang

(10) Patent No.: US 9,323,218 B2
(45) Date of Patent: Apr. 26, 2016

(54) GENERATING FULL-PARALLAX DIGITAL HOLOGRAMS

(75) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 242 days.

(21) Appl. No.: 13/554,663

(22) Filed: Jul. 20, 2012

(65) Prior Publication Data

US 2014/0022239 A1 Jan. 23, 2014

(51) Int. Cl.
G06F 15/00 (2006.01)
G03H 1/08 (2006.01)
G03H 1/04 (2006.01)

(52) U.S. Cl.
CPC ..... G03H 1/0808 (2013.01); *G03H 2001/0421* (2013.01); *G03H 2001/0833* (2013.01); *G03H 2210/30* (2013.01); *G03H 2240/62* (2013.01)

(58) Field of Classification Search
CPC ............ G06T 19/00; G03H 1/00; G03H 3/00; G03H 5/00
USPC .................................. 345/419, 955; 382/300
See application file for complete search history.

(56) References Cited

U.S. PATENT DOCUMENTS

| 6,301,028 B1* | 10/2001 | Tanaka ..................... G03H 1/26 359/22 |
|---|---|---|
| 7,295,200 B2 | 11/2007 | Cameron et al. |
| 7,564,606 B2 | 7/2009 | Kitamura |
| 2006/0118630 A1* | 6/2006 | Kersey ............... G06K 7/10663 235/457 |
| 2009/0238449 A1* | 9/2009 | Zhang et al. ................... 382/165 |
| 2010/0277566 A1* | 11/2010 | Cable ...................... G03H 1/02 348/40 |
| 2011/0237999 A1* | 9/2011 | Muller .................... A61F 9/008 604/20 |
| 2012/0044551 A1* | 2/2012 | Kitamura .......................... 359/9 |
| 2014/0210942 A1* | 7/2014 | Tsang ............................ 348/40 |

OTHER PUBLICATIONS

Tomoyoshi Shimobaba, Hirotaka Nakayama, Nobuyuki Masuda and Tomoyoshi Ito, "Rapid calculation algorithm of Fresnel computer-generated-hologram using look-up table and wavefront-recording plane methods for three-dimensional display", Optics Express, vol. 18, Issue 19, p. 19504-19509, Sep. 13, 2010.*
Kwo-Jyr Wong, Ching-Han L. Hsu, C.C. Jay Kuo, "Fractal-Based Image Coding with Polyphase Decomposition", Proc. SPIE 2094, Visual Communications and Image Processing '93, p. 1207-1218, Oct. 22, 1993.*

(Continued)

*Primary Examiner* — Weiming He
(74) *Attorney, Agent, or Firm* — Amin, Turocy & Watson, LLP

(57) ABSTRACT

Techniques for efficiently generating full parallax 3-D holographic images of a 3-D real or synthetic object scene are presented. A holographic generator component (HGC) can receive a real object scene or generate a synthetic object scene. The HGC can downsample the scene by a defined downsampling factor and generate, from the downsampled scene, an intermediate object wavefront recording plane (WRP) that can be placed in close proximity to the scene. The HGC can expand and interpolate the WRP to generate the holographic images. The HGC can decompose a scene into polyphase image components (PICs), generate a WRP for the image components, sum the WRP of the PICs, and expand and interpolate the WRP to generate holographic images of the scene. The HGC can utilize look-up tables to store and use wavefront patterns of each region of an image to facilitate reducing computational operations in generating the holographic images.

29 Claims, 19 Drawing Sheets

(56) References Cited

OTHER PUBLICATIONS

Ting-Chung Poon, Jung-Ping Liu, "Introduction to Modern Digital Holography With Matlab", published on Mar. 2014, ISBN 9781107016705.*

Weng et al. "Generation of real-time large computer generated hologram using wavefront recording method", Optics Express, vol. 20, Issue 4, pp. 4018-4023, Feb. 2, 2012.*

S.C. Kim and E.S. Kim, "Fast computation of hologram patterns of a 3D object using run-length encoding and novel look-up table methods," Appl. Opt. 48, pp. 1030-1041, 2009.

T. Yamaguchi, G. Okabe, H. Yoshikawa, "Real-time image plane full-color and full-parallax holographic video display system", Opt. Eng., vol. 46, pp. 125801-126000, 2007.

H. Yoshikawa, "Fast computation of fresnel holograms employing difference", Opt. Rev., vol. 8, No. 5, pp. 331-335, 2001.

P.W.M. Tsang, J.-P. Liu, K.W.K. Cheung, and T.-C. Poon, "Fast generation of Fresnel holograms based on multirate filtering", Appl. Opt. 48, H23-H30, 2009.

Hironobu Sakata and Yuji Sakamoto, "Fast computation method for a Fresnel hologram using three-dimensional affine transformations in real space," Appl. Opt. 48, H212-H221 (2009).

Tomoyoshi Shimobaba, Hirotaka Nakayama, Nobuyuki Masuda and Tomoyoshi Ito, "Rapid calculation of Fresnel computer-generated-hologram using look-up table and wavefront-recording plane methods for three-dimensional display", Optics Express, 18, 19, 2010.

Peter Tsang, W.-K. Cheung, T.-C. Poon, and C. Zhou, "Holographic video at 40 frames per second for 4-million object points," Opt. Express 19, 15205-15211 Aug. 2011.

* cited by examiner

GENERATING FULL-PARALLAX DIGITAL HOLOGRAMS

TECHNICAL FIELD

The subject disclosure relates generally to holograms, and in particular, to generating full-parallax digital holograms.

BACKGROUND

Since the appearance of the Princess Leia holographic message in the 1970's Star War movie, researchers have been exploring the feasibility of producing a real world prototype. In recent years, similar excitement has been stirred up in the community with the "Three Dimensional (3-D) forensic chamber" in the television series "Bones".

With the advancement of computers, digital holography has become an area of interest and has gained some popularity. Research findings derived from digital holography technology enables holograms to be generated with numerical means and displayed with holographic devices such as a liquid crystal on silicon (LCOS) display. Holograms generated in this manner can be in the form of numerical data that can be recorded, transmitted, and processed with digital techniques. On top of that, the availability of high-capacity digital storage and wide-band communication technologies also are leading to the emergence of real-time video holography, casting light on the potential future of three-dimensional (3-D) television system.

Currently, development in digital holography has reached some degree of maturity. However, conventional digital holography can involve a relatively high amount of computation to generate an object scene, and this can impose a significant bottleneck (e.g., level of restriction or impediment) in practical applications. While some analytic methods have been proposed recently in an attempt to overcome this issue, with such conventional techniques, the shortening in the computation time may not be significant when the object scene is composed of a relatively large number of object points.

The above-described description is merely intended to provide a contextual overview of generating digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

Systems, methods, computer readable storage mediums, and techniques disclosed herein relate to generating three-dimensional holograms. Disclosed herein is a system comprising at least one memory that stores computer executable components, and at least one processor that facilitates execution of the computer executable components stored in the at least one memory. The computer executable components comprising a holographic generator component that generates an intermediate object wavefront recording plane from a downsampled three-dimensional object scene, wherein the intermediate object wavefront recording plane is within a defined distance of the downsampled three-dimensional object scene. The computer executable components also including a hologram enhancer component that expands the intermediate object wavefront recording plane via use of an interpolation process to generate a three-dimensional hologram representative of a three-dimensional object scene associated with the downsampled three-dimensional object scene.

Also disclosed herein is a method that includes generating, by a system including at least one processor, an intermediate object wavefront recording plane from a downsampled three-dimensional object scene, wherein the intermediate object wavefront recording plane is within a defined distance of the downsampled three-dimensional object scene. The method further includes converting, by the system, the intermediate object wavefront recording plane to facilitate generating a three-dimensional hologram representing a three-dimensional object scene associated with the downsampled three-dimensional object scene.

Further disclosed herein is a non-transitory computer readable storage medium comprising computer executable instructions that, in response to execution, cause a system including a processor to perform operations. The operations include generating an intermediate object wavefront recording plane from a downsampled three-dimensional object scene, wherein the intermediate object wavefront recording plane is within a defined distance of the downsampled three-dimensional object scene. The operations also include expanding the intermediate object wavefront recording plane using an interpolation process to facilitate generating a three-dimensional hologram representing a three-dimensional object scene associated with the downsampled three-dimensional object scene.

The disclosed subject matter also includes a system comprising means for generating an intermediate object wavefront recording plane from a downsampled three-dimensional object scene, wherein the intermediate object wavefront recording plane is within a defined distance of the downsampled three-dimensional object scene. The system further includes means for expanding the intermediate object wavefront recording plane using an interpolation process to facilitate generating a three-dimensional hologram representing a three-dimensional object scene associated with the downsampled three-dimensional object scene.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
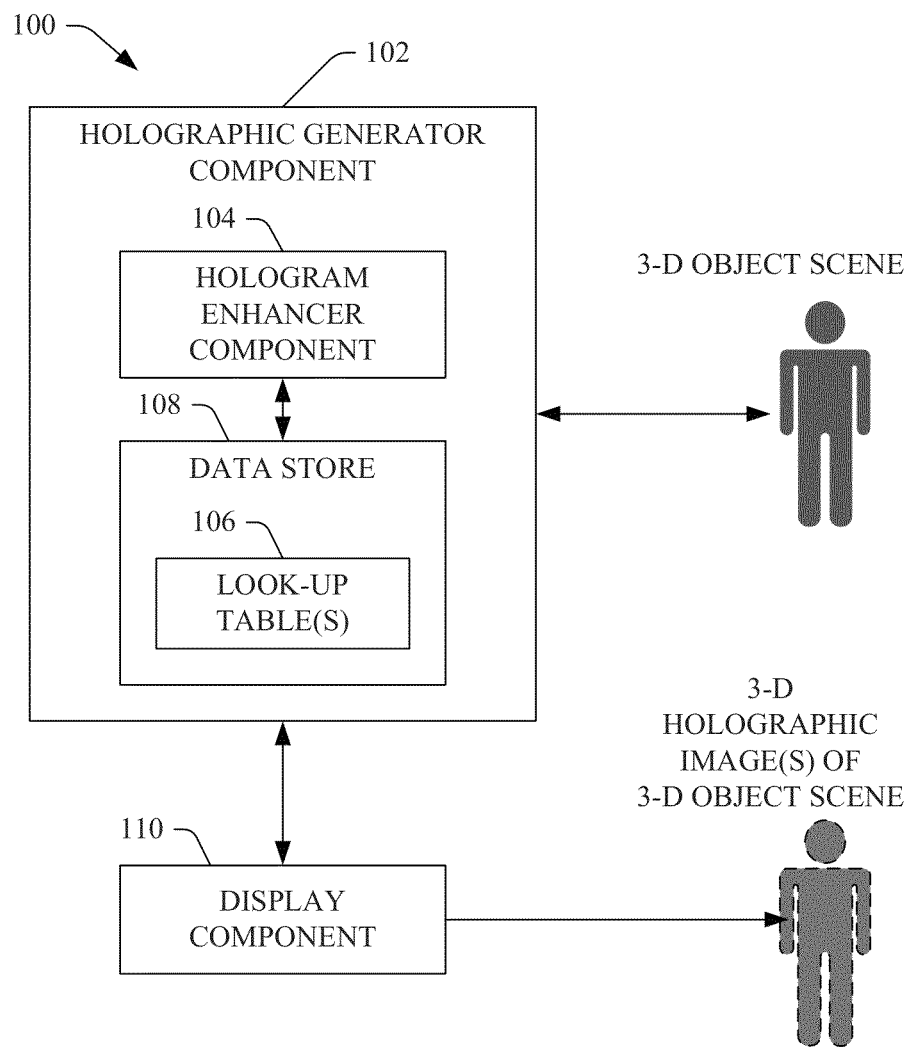
FIG. 1 illustrates a block diagram of an example system that can efficiently generate a full-parallax three-dimensional (3-D) hologram(s) of a real or synthetic 3-D object scene(s) in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

With the advancement of computers, digital holography has become an area of interest and has gained some popularity. Research findings derived from digital holography technology enables holograms to be generated with numerical means and displayed with holographic devices such as a liquid crystal on silicon (LCOS) display. Holograms generated in this manner can be in the form of numerical data that can be recorded, transmitted, and processed with digital techniques. On top of that, the availability of high-capacity digital storage and wide-band communication technologies also are leading to the emergence of real-time video holography, casting light on the potential future of three-dimensional (3-D) television system.

Currently, development in digital holography has reached some degree of maturity. However, conventional digital holography can involve a relatively high amount of computation to generate an object scene, and this can impose a significant bottleneck (e.g., level of restriction or impediment) in practical applications. While some analytic methods have been proposed recently in an attempt to overcome this issue, with such conventional techniques, the shortening in the computation time may not be significant when the object scene is composed of a relatively large number of object points and/or the quality of the reconstructed 3-D can be degraded.

One conventional technique can generate a Fresnel hologram of a 3-D object scene numerically by computing the fringe patterns emerged from each object point to the hologram plane. Although this technique can have some measure of effectiveness, the computation involved can be extremely and/or unacceptably high. Some research has been attempted to overcome this deficiency with little or no success.

Another conventional technique can compute the fringe pattern of each object point within a small window on a virtual wavefront recording plane (WRP) that can be placed very close to the scene. Subsequently, the hologram can be generated, with a graphics processing unit (GPU), from the WRP with Fresnel diffraction. Employing a typical PC and a conventional GPU, a hologram of size 2048×2048 pixels can be generated for a scene comprising a relatively modest number of approximately $3 \times 10^4$ object points. However, as the number of object points increases, the amount of time taken to derive the WRP (and the hologram) will be lengthened in a linear manner and the amount of computational resources used to derive the WRP (and the hologram) will correspondingly increase as well.

To that end, techniques for efficiently generating (e.g., quickly numerically generating) full-parallax three-dimensional (3-D) holograms (e.g., 3-D Fresnel holograms) of a real or synthetic 3-D object scene are presented. A holographic generator component (HGC) can receive (e.g., obtain) a real 3-D object scene (e.g., a captured scene), or can generate or receive a synthetic 3-D object scene. The HGC include a hologram enhancer component (HEC) that can generate a full-parallax digital 3-D hologram (e.g., Fresnel hologram) to facilitate generating or reconstructing full-parallax digital 3-D holographic images (e.g., Fresnel holographic images) that can represent or recreate the original real or synthetic 3-D object scene.

The HEC can downsample the 3-D object scene by a defined downsampling factor. The downsampling of the 3-D object scene can reduce the complexity of the 3-D object scene. The HEC can identify, determine, select, and/or use the defined downsampling factor based at least in part on defined holographic generation criterion(s). The defined holographic generation criterion (e.g., for identifying, determining, or selecting the defined downsampling factor) can relate to, for example, resolution of the original image of the 3-D object scene, desired resolution of the holographic image associated with the 3-D object scene, resolution of the display device(s) that will be or is expected to be displaying the holographic image, available computational resources to generate the hologram or associated holographic image, available amount of time to generate the hologram or associated holographic image, etc. The HEC can identify, determine, select, and/or use the defined downsampling factor, for example, to obtain a desired balance or compromise between the resolution of the reconstructed holographic 3-D image and computation efficiency, in accordance with the defined holographic generation criterion(s).

The downsampled 3-D object scene can include a plurality (e.g., array) of object points, wherein each object point can be respectively associated with (e.g., within or centered in) a corresponding window. In accordance with various implementations, the HEC can generate the downsampled 3-D object scene wherein all, a portion, or none of the windows (e.g., adjacent windows) respectively corresponding to object points of the downsampled 3-D object scene can be partially overlapping each other.

The HEC can generate, from the downsampled 3-D object scene, an intermediate object wavefront recording plane (WRP) that can be placed in close proximity to the 3-D object scene. The HEC can derive or determine the WRP from an accumulation of contributions from each sampled object point of the downsampled 3-D object scene, wherein each sampled object point can cast a window of fringe patterns. The HEC can generate the downsampled 3-D object scene such that all, a portion, or none of the windows (e.g., adjacent windows) of fringe patterns respectively corresponding to the sampled object points can be partially overlapping each other.

The HEC can expand and/or interpolate the WRP to generate a full-parallax 3-D hologram (e.g., Fresnel hologram) and/or corresponding full-parallax holographic 3-D images (e.g., Fresnel holographic images) representing or recreating the original 3-D object scene. The HEC can utilize one or more look-up tables to store wavefront patterns of each region of an image, and can use the wavefront patterns in the one or more look-up tables to facilitate reducing computational operations in obtaining WRPs for generating the hologram and/or generating or reconstructing the holographic 3-D images representing or recreating the original 3-D object scene. The interpolation process employed by the HEC can facilitate compensating for sparseness on the downsampled 3-D object scene, and can be performed by the HEC using a relatively low amount of computations (e.g., can be conducted by the HEC in a near computation free manner), which can result in an efficient (e.g., relatively low amount of) use of computation resources and time.

In some implementations, the HEC can generate wavefront patterns of each region of a 3-D image of the 3-D object scene for which a 3-D hologram is being generated and/or can store these wavefront patterns of each region of a 3-D image in a look-up table(s) (e.g., stored in a data store) to facilitate reducing computational operations in obtaining the WRP and/or generating the hologram or corresponding holographic images. The HEC can retrieve wavefront patterns (e.g., pre-stored wavefront patterns) of each region (e.g., square region) of a 3-D image from the look-up table(s) and can use these wavefront patterns to facilitate generating the WRP of the 3-D image in an efficient manner (e.g., using the stored wavefront patterns to generate the WRP using minimal or no computation).

Downsampling of a 3-D object scene may result in a 3-D image(s) of the scene becoming sparse, which can make a corresponding reconstructed 3-D holographic image appear degraded. A significant amount of empty space in a sampling lattice of the 3-D image may result in a relatively poor signal-to-noise ratio (SNR). The disclosed subject matter can overcome these and other potential deficiencies by employing an interpolative wavefront recording plane (IWRP).

In certain implementations, the HEC can employ the IWRP by replacing each object point of a downsampled 3-D image of a scene with a square image block, and the HEC can record the wavefront pattern of the square image block on the WRP. The HEC can pre-compute and store the wavefront pattern of each square region of the downsampled 3-D image in a look-up table(s), which can be stored in a data store. This can facilitate reducing the number of computational operations used in obtaining the WRP, as the HEC can use the stored wavefront patterns to obtain the WRP instead of having to compute them when generating the 3-D hologram corresponding to the original 3-D image. As part of the process of generating the 3-D hologram corresponding to the original 3-D image, the HEC can retrieve or obtain the stored wavefront pattern of each square region of the 3-D image from the look-up table(s) and can use these wavefront patterns to obtain the WRP to facilitate generating the 3-D hologram (e.g., full-parallax 3-D Fresnel hologram) in an efficient manner (e.g., using the stored wavefront patterns to obtain the WRP using minimal or no computation).

In some implementations, the HEC can decompose or separate a 3-D object scene (e.g., a downsampled 3-D object scene) into a plurality of polyphase image components of the 3-D object scene. The HEC can generate respective WRPs or IWRPs for each of the polyphase image components. The generation of the respective WRPs or IWRPs for each of the polyphase image components can be a low computation or near computation free process. The HEC can sum the WRPs or IWRPs of the polyphase image components. In certain implementations, the HEC can use a GPU or a field-programmable gate array (FPGA) to facilitate summing the WRPs or IWRPs of the polyphase image components using texture blending, which can be a process that can be relatively low in complexity. In certain implementations, the HEC can use an expander component and/or interpolator component that respectively can expand and/or interpolate the blended or summed WRPs to generate the 3-D hologram (e.g., full-parallax 3-D Fresnel hologram). The 3-D hologram can be used (e.g., by the HGC or another component) to generate or reconstruct 3-D holographic images that can represent or recreate the original 3-D object scene. The HEC can interpolate the blended or summed WRPs using, for example, 2-D interpolation conducted in the frequency space to facilitate generating blended or summed IWRPs associated with the respective polyphase image components to compensate for and/or reduce (e.g., fill in or fill up) empty space between the samples associated with respective sampled object points associated with the downsampled 3-D object scene.

Turning to the drawings, and referring initially to FIGS. 15-19, FIG. 15 illustrates a diagram of an example optical holography process 1500 for generation and use of a hologram to reproduce a 3-D object scene from two-dimensional (2-D) media (e.g., film). As part of the optical holography process 1500, as depicted at 1502, a 3-D object scene 1504 can be recorded or obtained using, for example, a laser and/or a capturing device, to generate a hologram 1506 that can comprise 2-D images (e.g., 2-D images of a 3-D object image from various perspectives). The hologram 1506 can be recorded on media (e.g., 2-D media, such as film). As further part of the optical holography process 1500, as depicted at 1508, a laser (e.g., reference beam) can be applied to the hologram 1506 to generate or reconstruct 3-D holographic images 1510 that can represent or recreate the original 3-D object scene.

Figure 16:
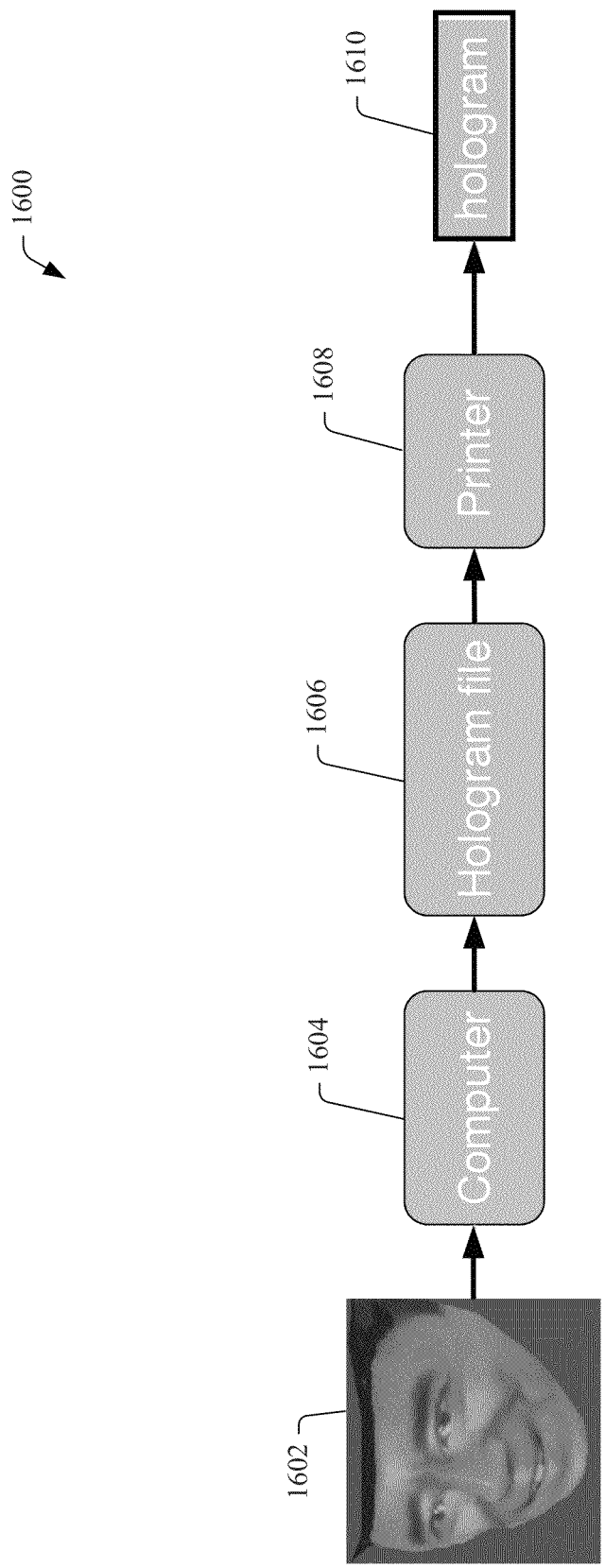
FIG. 16 presents a diagram of an example computer generated holography process for computer generation of a hologram of a 3-D computer graphic model of a synthesized 3-D object scene.

FIG. 16 depicts a diagram of an example computer generated holography (CGH) process 1600 for computer generation of a hologram of a 3-D computer graphic model of a synthesized 3-D object scene. The CGH process 1600 can be used to generate holograms numerically from 3-D computer-generated models that synthesize a 3-D object scene that does not exist in the real world.

As part of the CGH process 1600, at 1602, a computer-graphic model of a 3-D object scene can be generated (e.g., by a computer). The computer-graphic model of a 3-D object scene can depict the 3-D object scene from various perspectives (e.g., encompassing a 360-degree perspective). At 1604, a computer (e.g., employing an image generator) can be used to generate a hologram file associated with the computer-graphic model of a 3-D object scene, as shown at 1606. The hologram file can be an electronic file comprising data that, for each 3-D image of the scene, can correspond or relate to a desired number of 2-D images from various perspectives of the 3-D image that together (e.g., when integrated) can make up (e.g., reconstruct) the 3-D image.

At 1608, a printer (e.g., fringe printer) can be used to generate a hologram (e.g., 3-D Fresnel hologram) that can be recorded, printed, or contained on a desired media (e.g., 2-D media, such as film), as shown at 1610. For a 3-D object image or scene (e.g., computer-graphic model of a 3-D object scene), the CGH process 1600 can generate a Fresnel hologram numerically as the real part of the product of the object (e.g., 3-D object image) and planar reference waves. A 3-D Fresnel holographic image or scene can be reconstructed using the Fresnel hologram and a reference beam (e.g., laser).

For example, a planar object can generate a diffraction pattern D(x,y), which can result in a hologram after adding a reference beam. Given a set of 3-D object points $O=[o_0(x_0, y_0, z_0), o_1(x_1, y_1, z_1), \ldots, o_{N-1}(x_{N-1}, y_{N-1}, z_{N-1})]$, the diffraction pattern D(x, y) can be generated numerically with the following equation:

$$D(x, y) = \sum_{j=0}^{N_P-1} \frac{a_j}{r_j} \exp(ikr_j) = \sum_{j=0}^{N_P-1} \left[ \frac{a_j}{r_j} \cos(kr_j) + i \frac{a_j}{r_j} \sin(kr_j) \right]$$

where $a_j$ and $r_j$ represent the intensity of the 'jth' point in O (e.g., source object) and its distance to the position (x, y) on the diffraction plane, $$k = \frac{2\pi}{\lambda}$$

is the wavenumber and $\lambda$ is the wavelength of the reference beam. Subsequently, a hologram H(x, y) can be generated by adding a reference beam (R(x,y)) to the diffraction pattern (D(x,y)), in accordance with the following equation:

$$H(x,y) = \text{Re}\{D(x,y)R^*(x,y)\}$$

Figure 17:
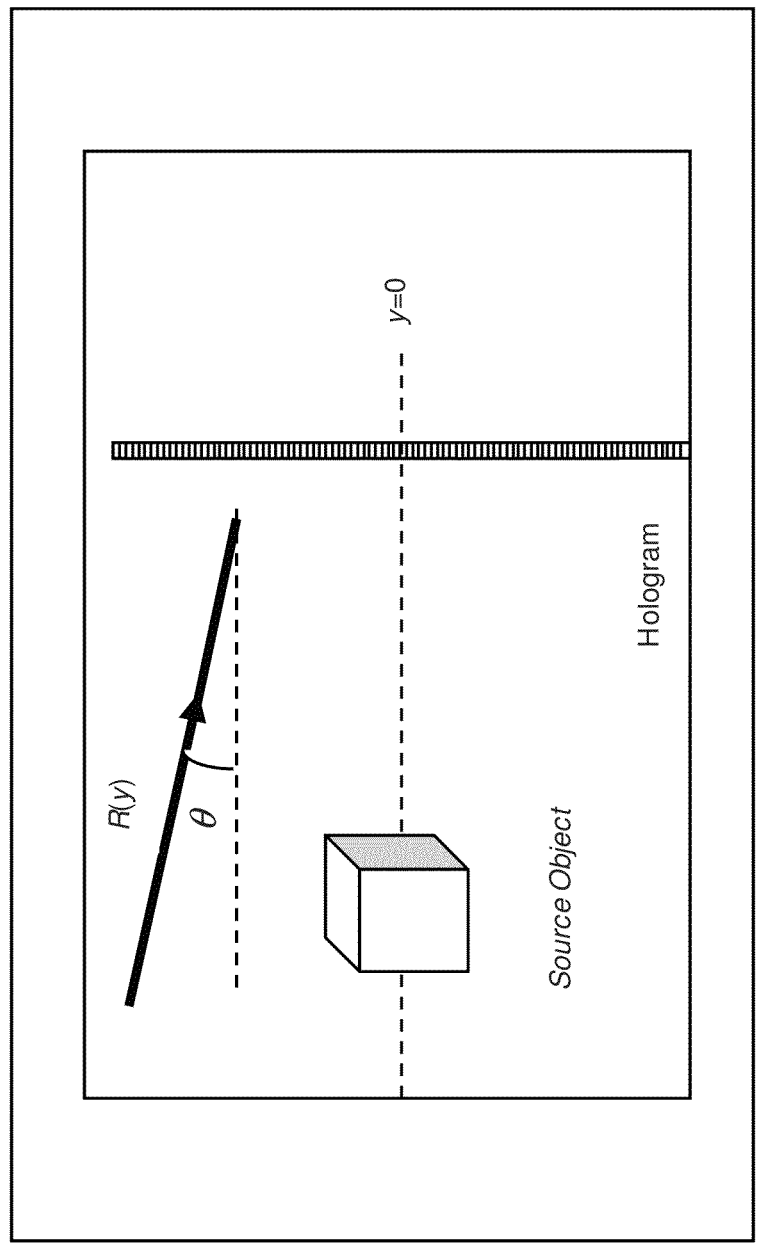
FIG. 17 illustrates a diagram of example holographic process wherein a reference beam can be applied to a diffraction pattern at a desired incident angle to facilitate generating the hologram.

In a relatively simple case, R(x,y) can be a plane wave R(y). Referring briefly to FIG. 17, illustrated is a diagram of example holographic process 1700 wherein a reference beam R(y) can be applied to a diffraction pattern at a desired incident angle $\theta$ to facilitate generating the hologram.

CGH can involve a large amount of computation in order to generate the hologram and/or reproduce a holographic image from the hologram. Also, storing or transmitting the hologram can involve a relatively high and/or undesirable (e.g., unacceptable, cost prohibitive, etc.) data rate.

In some implementations, an electronically-accessed spatial light modulator (SLM) and a LCOS can be used to enable computer generated holograms to be displayed in real time without the need of producing hardcopies with photographic techniques or an expensive fringe writer.

Figure 18:
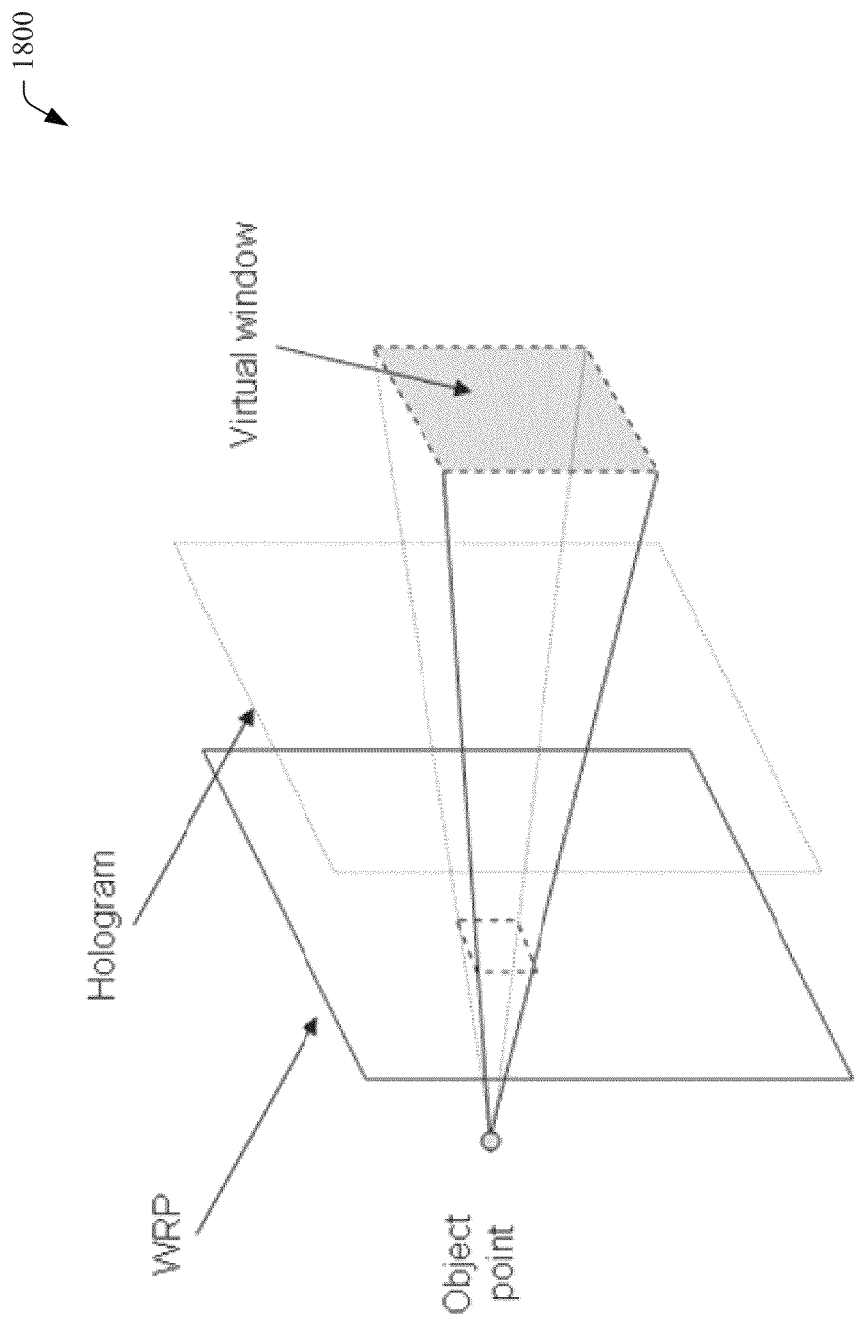
FIG. 18 illustrates a diagram of an example process for generating holograms based on a WRP.

FIG. 18 illustrates a diagram of an example process 1800 for generating holograms (e.g., Fresnel holograms) based on a WRP. In accordance with the process 1800, the wavefront of each object point of a 3-D object scene can be computed on a WRP that can be close to the 3-D object scene. The computation for the WRP can be performed using, for example, a central processing unit (CPU). The wavefront of the object points on the WRP can be summed. As the coverage of each object point can be relatively small, the computing of the WRP can be relatively quick. The WRP can be expanded to a hologram using a forward and an inverse 2-D fast Fourier transform (FFT). A GPU can be employed to facilitate expanding the WRP to a hologram. The process 1800 can be capable of generating, for example, a 2048×2048 pixel hologram that can represent $10^4$ object points at 10 frames per second.

Figure 19:
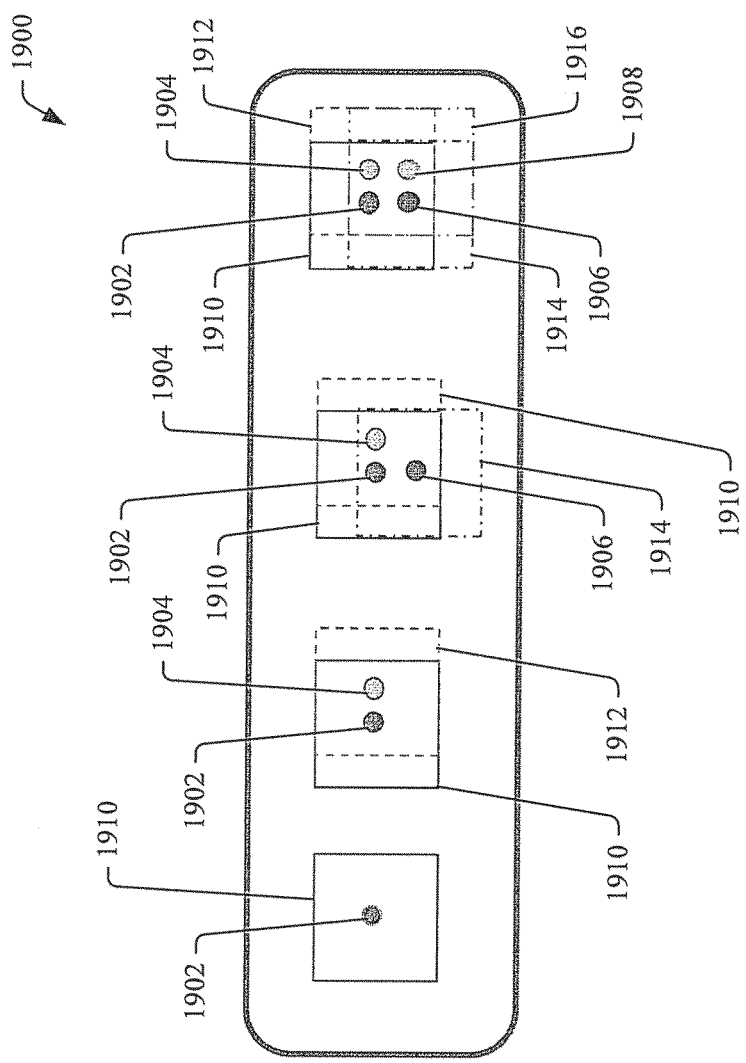
FIG. 19 depicts an example diagram of a subset of object points of a 3-D image.

An issue with this process can be that generation of the WRP for a 3-D object scene can result in an undesirable (e.g., unacceptable, cost prohibitive, etc.) amount of computation time and/or resources. Conventional holographic generation techniques can be relatively complex and can involve a relatively long computation time. Referring briefly to FIG. 19 (along with FIG. 18), FIG. 19 depicts an example diagram of a subset (e.g., four) of object points 1900 of a 3-D image. When generating the WRP for the subset object points 1900, for each object point, such as object points 1902, 1904, 1906, 1908, etc., the wavefront with the square area (e.g., square areas 1910, 1912, 1914, 1916, etc., respectively) has to be computed and accumulated onto the WRP. As a result, the larger the number of object points for an image, the longer the computation time and the more computation resources that may be used to generate the WRP for a 3-D image.

FIG. 1 illustrates a block diagram of an example system 100 that can efficiently generate (e.g., quickly numerically generate) a full-parallax three-dimensional (3-D) hologram(s) (e.g., 3-D Fresnel hologram(s)) of a real or synthetic 3-D object scene(s) in accordance with various aspects and embodiments of the disclosed subject matter. In an aspect, the system 100 can include a holographic generator component (HGC) 102 that can desirably generate a hologram (e.g., sequence of 3-D holographic images) that can represent a 3-D object scene (e.g., real or computer-synthesized 3-D object scene) from multiple different viewing perspectives that can correspond to multiple different viewing perspectives of the 3-D object scene. The hologram can be used to generate, reconstruct, or reproduce 3-D holographic images for display to one or more viewers, wherein the 3-D holographic images can represent or recreate the original 3-D object scene from multiple visual perspectives. In some embodiments, the HGC 102 and/or other components (e.g., display component 110) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image can be viewed, for example, as a 3-D image floating in mid-air in a desired display area (e.g., 3-D chamber).

The HGC 102 can receive (e.g., obtain) a real 3-D object scene (e.g., captured 3-D object scene), or can generate or receive a synthetic 3-D object scene (e.g., computer generated 3-D object scene). The HGC 102 can include a hologram enhancer component (HEC) 104 that can generate a full-parallax digital 3-D hologram (e.g., Fresnel hologram) to facilitate generating or reconstructing full-parallax digital 3-D holographic images (e.g., Fresnel holographic images) that can represent or recreate the original real or synthetic 3-D object scene.

The HEC 104 can downsample or decimate the 3-D object scene by a defined downsampling factor or defined decimation factor. The defined downsampling factor or defined decimation factor can be a desired real or integer number greater than 1. The downsampling or decimating of the 3-D object scene can reduce the complexity of the 3-D object scene. Resolution of a spatial image can generally be lower than a hologram. The dot pitch of a display monitor (e.g., video graphics array (VGA) monitor) can be approximately 200 microns, and the dot pitch of a hologram can be below 10 microns. As a result, computing the wavefront of all of the object points of a spatial image may be unnecessary. The HEC 104 can downsample or decimate a 3-D object scene to facilitate reducing the complexity of the 3-D object scene, while still preserving desirable (e.g., acceptable) resolution of the 3-D holographic images representing the 3-D object scene.

The HEC 104 can identify, determine, select, and/or use the defined downsampling factor or the defined decimation factor based at least in part on defined holographic generation criterion(s). The defined holographic generation criterion (e.g., for identifying, determining, or selecting the defined downsampling or decimation factor) can relate to, for example, resolution of the original image of the 3-D object scene, desired resolution of the holographic image associated with the 3-D object scene, resolution of the display device(s) (e.g., display component 110) that will be or is expected to be displaying the holographic image, available computational resources to generate the hologram or associated holographic image, available amount of time to generate the hologram or associated holographic image, etc. The HEC 104 can identify, determine, select, and/or use the defined downsampling or decimation factor, for example, to obtain a desired balance or compromise between the resolution of the reconstructed holographic 3-D image and computation efficiency, in accordance with the defined holographic generation criterion(s). For reasons of brevity and clarity, the term downsampling is generally used throughout this disclosure. It is to be appreciated and understood that a decimation process can be used in place of or in addition to a downsampling process with regard to aspects of this disclosure that are described using a downsampling process.

Figure 2:
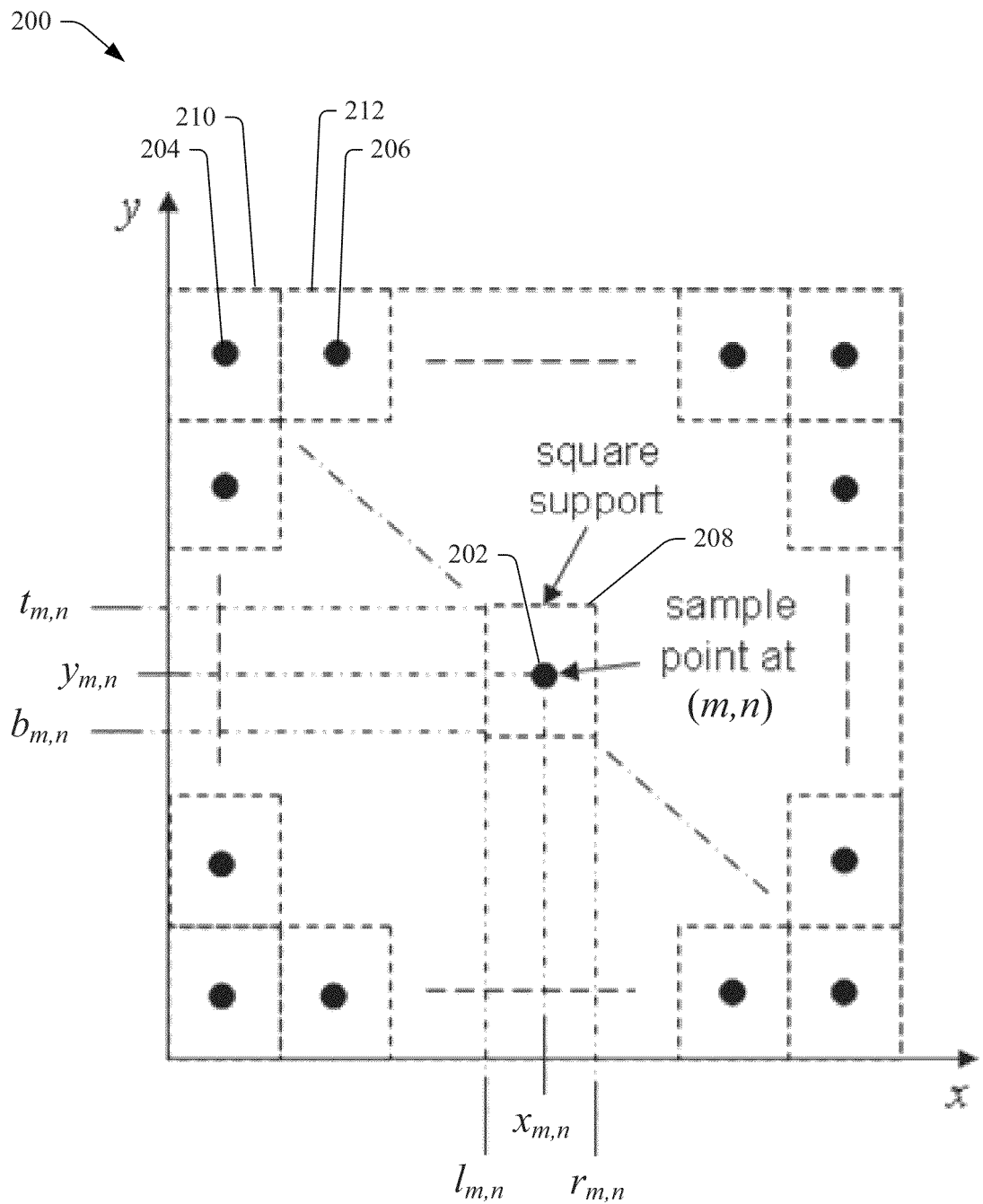
FIG. 2 depicts a diagram of an example image of a 3-D object scene.

The downsampled 3-D object scene can include a plurality (e.g., array) of object points, wherein each object point can be respectively associated with (e.g., within or centered in) a corresponding window. Each object point can project the wavefront onto the intermediate object wavefront recording plane (WRP) within an associated square region. In accordance with various implementations, the HEC 104 can generate the downsampled 3-D object scene wherein all, a portion, or none of the windows (e.g., windows of object wavefront) respectively corresponding to object points of the downsampled 3-D object scene can be partially overlapping each other. Referring briefly to FIG. 2 (along with FIG. 1), depicted in FIG. 2 is a diagram of an example image 200 (e.g., visual image) of a 3-D object scene, wherein the image 200 can be comprise a plurality of object points, such as object point 202 (e.g., object point located at (m,n)), object point 204, object point 206, etc. Each object point (e.g., 202, 204, 206, etc.) can be associated with a corresponding square region (also referred to herein as a square support), such as square region 208, square region 210, square region 212, etc. For instance, in relation to a 2-D Cartesian coordinate system, the object point 202 can be located at $x_{m,n}$, $y_{m,n}$, with the top of the corresponding square region 208 being located at $t_{m,n}$, the bottom of the corresponding square region 208 being located at $b_{m,n}$, the left side of the corresponding square region 208 being located at $l_{m,n}$, and the right side of the corresponding square region 208 being located at $r_{m,n}$.

The HEC 104 can generate, from the downsampled 3-D object scene, a WRP (intermediate object wavefront recording plane) that can be placed in close proximity to the 3-D object scene. The HEC 104 can derive or determine the WRP from an accumulation of contributions from each sampled object point of the downsampled 3-D object scene, wherein each sampled object point can cast a window of fringe patterns. For instance, the HEC 104 can convert each object point in the downsampled 3-D object scene into a small window of object wavefront, which can be accumulated onto a WRP, which can be placed relatively close to the 3-D object scene. The HEC 104 can generate or structure the windows of fringe patterns (e.g., adjacent windows) in relation to each other to have all, a portion, or none of the windows of fringe patterns respectively corresponding to the sampled object points partially overlapping each other.

In some implementations, the HEC 104 can map, for each object point, a non-overlapping window of object wavefront to the WRP. However, in using non-overlapping windows, it can be desirable (e.g., advantageous or necessary) for the object points to be separated sufficiently far apart from each other to maintain a sufficiently large window of fringe patterns. As the windows in the WRP are non-overlapping with each other, the downsampling factor can be governed by (e.g., determined or constrained as a function of) the window size, and this may result in a significant reduction in the resolution of the 3-D object scene as it is reconstructed from the hologram.

In other implementations, the HEC 104 can generate or structure the windows of fringe patterns (e.g., adjacent windows) in relation to each other to have all or a portion of the windows of fringe patterns respectively corresponding to the sampled object points partially overlapping each other. The partial overlapping of windows can allow the downsampling factor to be independent, or at least substantially independent, of the window size, and can enable the HEC 104 to generate holograms using a desired spacing (e.g., smaller spacing) between object points (e.g., adjacent object points), a desired downsampling factor (e.g., a larger downsampling factor), and a desired window size (e.g., a sufficiently large window of fringe patterns), which can thereby provide for improved resolution of the 3-D object scene as it is reconstructed from the hologram.

In accordance with various implementations, the HEC 104 can expand and/or interpolate the WRP to generate a full-parallax 3-D hologram (e.g., Fresnel hologram) and/or facilitate generating corresponding full-parallax holographic 3-D images (e.g., Fresnel holographic images) representing or recreating the original 3-D object scene. The HEC 104 can expand or convert the WRP to a hologram using, for example, a forward and an inverse 2-D fast Fourier transform (FFT). In some implementations, as part of the expansion of the WRP to a hologram, the HEC 104 can use interpolation, such as 2-D interpolation, conducted in the frequency space to facilitate expansion and interpolation of the WRP to generate the full-parallax 3-D hologram (e.g., Fresnel hologram). In accordance with various implementations, the HEC 104 can use a GPU and/or an FPGA to facilitate expanding the WRP to a hologram and/or performing other operations associated with generating the hologram. The interpolation process employed by the HEC 104 can facilitate compensating for sparseness on the downsampled 3-D object scene, as more fully disclosed herein, and can be performed by the HEC 104 using a relatively low amount of computations (e.g., can be conducted by the HEC 104 in a near computation free manner), which can result in an efficient (e.g., relatively low amount of) use of computational resources and time The HEC 104 can utilize one or more look-up tables 106 to store wavefront patterns of each region of an image or scene, and can use the wavefront patterns in the one or more look-up tables 106 to facilitate reducing computational operations in obtaining WRPs for generating the hologram and/or generating or reconstructing the holographic 3-D images representing or recreating the original 3-D object scene. In some implementations, the HEC 104 can generate (e.g., compute, determine, etc.) wavefront patterns of each region of a 3-D image of the 3-D object scene for which a 3-D hologram is being generated and/or can store these wavefront patterns of each region of a 3-D image in a look-up table(s) 106, which can be stored in a data store 108, to facilitate reducing computational operations in obtaining the WRP and/or generating the hologram or corresponding holographic images. While the look-up tables 106 and the data store 108 are described in FIG. 1 as being located outside of the HEC 104, it is to be appreciated and understood that, in various other embodiments, the look-up tables 106 and/or the data store 108 can be part of the HEC 104.

Figure 3:
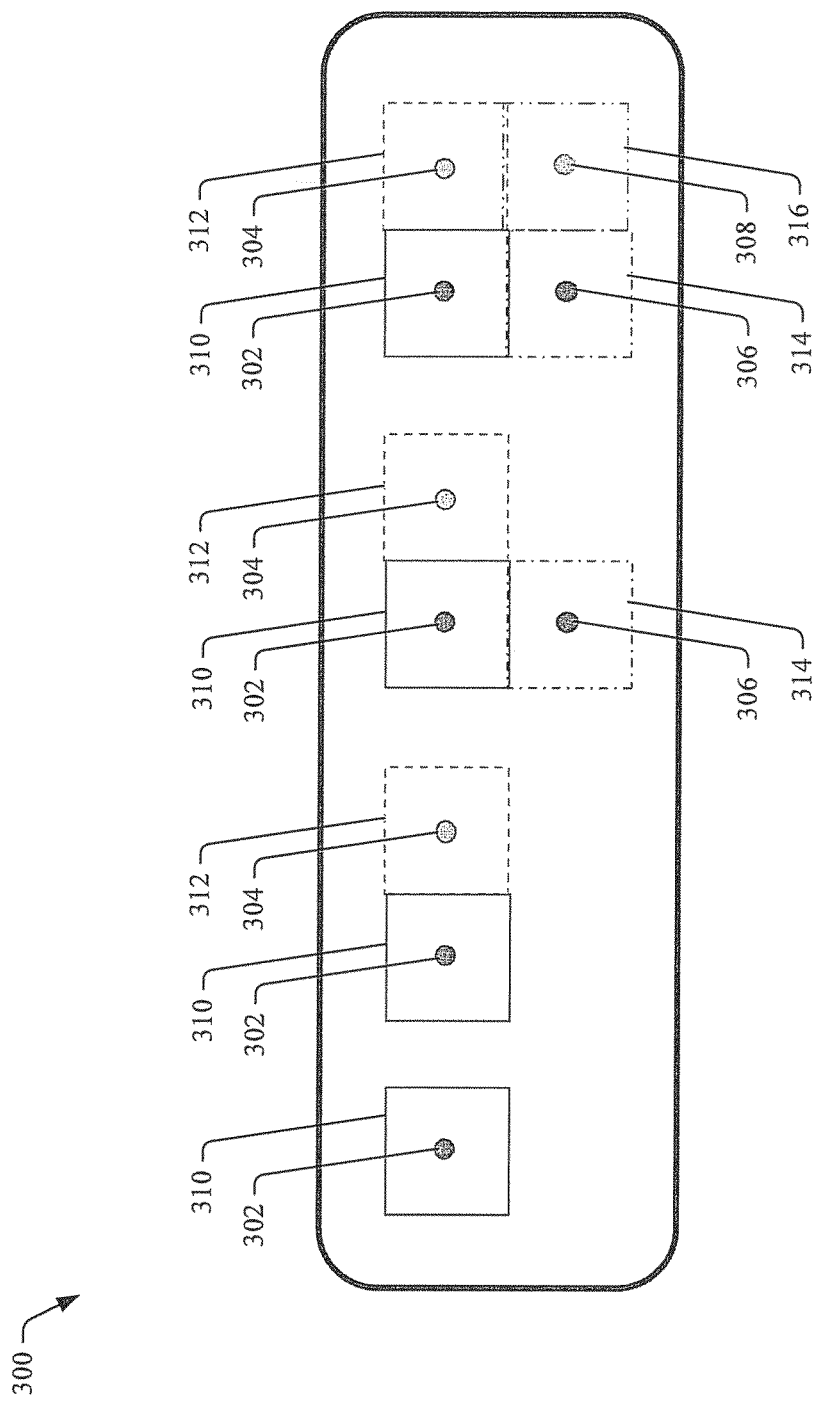
FIG. 3 illustrates a diagram of an example intermediate object wavefront recording plane (WRP) generated from a subset of object points in accordance with various aspects of the disclosed subject matter.

Referring briefly to FIG. 3 (along with FIG. 1), FIG. 3 depicts a diagram of an example WRP 300 generated from a subset (e.g., four) of object points in accordance with various aspects of the disclosed subject matter. The HEC 104 can generate the WRP 300 from the subset of object points, comprising object point 302, object point 304, object point 306, and object point 308, wherein the HEC 104 can generate and store the wavefront patterns of each square region (e.g., 310, 312, 314, 316) of a subset of square regions in a look-up table(s) 106.

As part of the hologram generation process, the HEC 104 can retrieve wavefront patterns (e.g., pre-stored wavefront patterns) of each region of a 3-D image from the one or more look-up tables 106 and can use these wavefront patterns to facilitate generating or obtaining the WRP of the 3-D image in an efficient manner (e.g., using the stored wavefront patterns to generate or obtain the WRP using minimal or no computation).

Downsampling of a 3-D object scene may result in a 3-D image(s) of the scene becoming undesirably (e.g., unacceptably) sparse, which can make a corresponding reconstructed 3-D holographic image appear degraded. A significant amount of empty space in a sampling lattice of the 3-D image may result in a relatively poor signal-to-noise ratio (SNR).

With further regard to FIG. 1, the HEC 104 can overcome these and other potential deficiencies by generating an interpolative wavefront recording plane (IWRP). In certain implementations, the HEC 104 can generate the IWRP by replacing each object point of a downsampled 3-D image of a scene with a square image block, and the HEC 104 can record the wavefront pattern of the square image block on the WRP.

Figure 4:
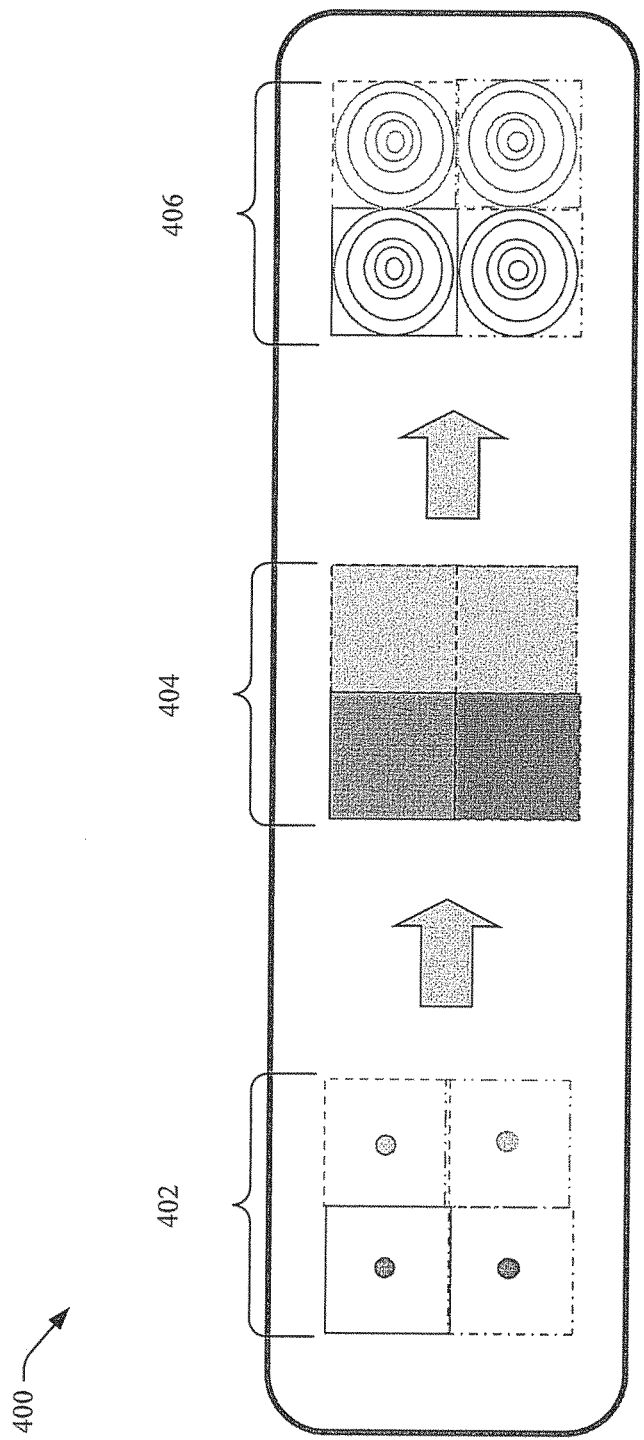
FIG. 4 illustrates a diagram of an example interpolative WRP (IWRP) generation process that can be used to generate an IWRP in accordance various aspects and implementations of the disclosed subject matter.

Referring briefly to FIG. 4 (along with FIG. 1), FIG. 4 illustrates a diagram of an example IWRP generation process 400 that can be used by the HGC 102, employing the HEC 104, to generate an IWRP in accordance various aspects and implementations of the disclosed subject matter. For a downsampled 3-D image of a 3-D object scene, the HEC 104 can identify or select a subset of object points 402 that can respectively be associated with corresponding square regions. The HEC 104 can replace each object point of the subset of object points 402 of a downsampled 3-D image with a respective square image block on the WRP, as depicted at 404. The HEC 104 can use a processor component (e.g., central processing unit (CPU) or other type of processing unit) to facilitate replacing each object point of the subset of object points 402 of a downsampled 3-D image with a respective square image block on the WRP. The HEC 104 can interpolate (e.g., using 2-D interpolation conducted in the frequency space) the WRP to generate the IWRP to facilitate expansion of the WRP (e.g., expansion of the IWRP), as illustrated at 406. The HEC 104 can use a GPU and/or an FPGA to facilitate interpolating the WRP to generate the IWRP. The HEC 104 can record the wavefront pattern of the square image block on the WRP or IWRP.

The HEC 104 can generate (e.g., determine or pre-determine, compute or pre-compute, etc.) and store the wavefront pattern of each square region (e.g., respectively associated with a corresponding object point) of the downsampled 3-D image in a look-up table(s) 106 that can be stored in the data store 108. This can facilitate reducing the number of computational operations used in obtaining the WRP or IWRP, as the HEC 104 can use the stored wavefront patterns to obtain the WRP or IWRP instead of having to compute them when generating the 3-D hologram corresponding to the original 3-D image.

As part of the process of generating the 3-D hologram corresponding to the original 3-D image, the HEC 104 can retrieve or obtain the stored wavefront pattern of each square region of the 3-D image from the look-up table(s) 106 and can use these wavefront patterns to obtain the WRP or IWRP to facilitate generating the 3-D hologram (e.g., full-parallax 3-D Fresnel hologram) in an efficient manner (e.g., using the stored wavefront patterns to obtain the WRP or IWRP using minimal or no computation).

The HEC 104, by generating an IWRP for a 3-D image of a 3-D object scene and/or using the look-up table(s) 106 to store wavefront patterns of square regions of the 3-D image, can generate, for example, a 2048×2048 pixel hologram, which can represent 4 million object points, at 40 frames per second. The HGC 102, by employing the HEC 104, can efficiently generate full-parallax 3-D Fresnel holograms that can represent less than 4 million object points, 4 million object points, or more than 4 million object points, at less than 40 frames per second, 40 frames per second, or more than 40 frames per second. The hologram generation process of the disclosed subject matter can thus provide a significant improvement over conventional hologram generation processes or techniques.

Figure 5:
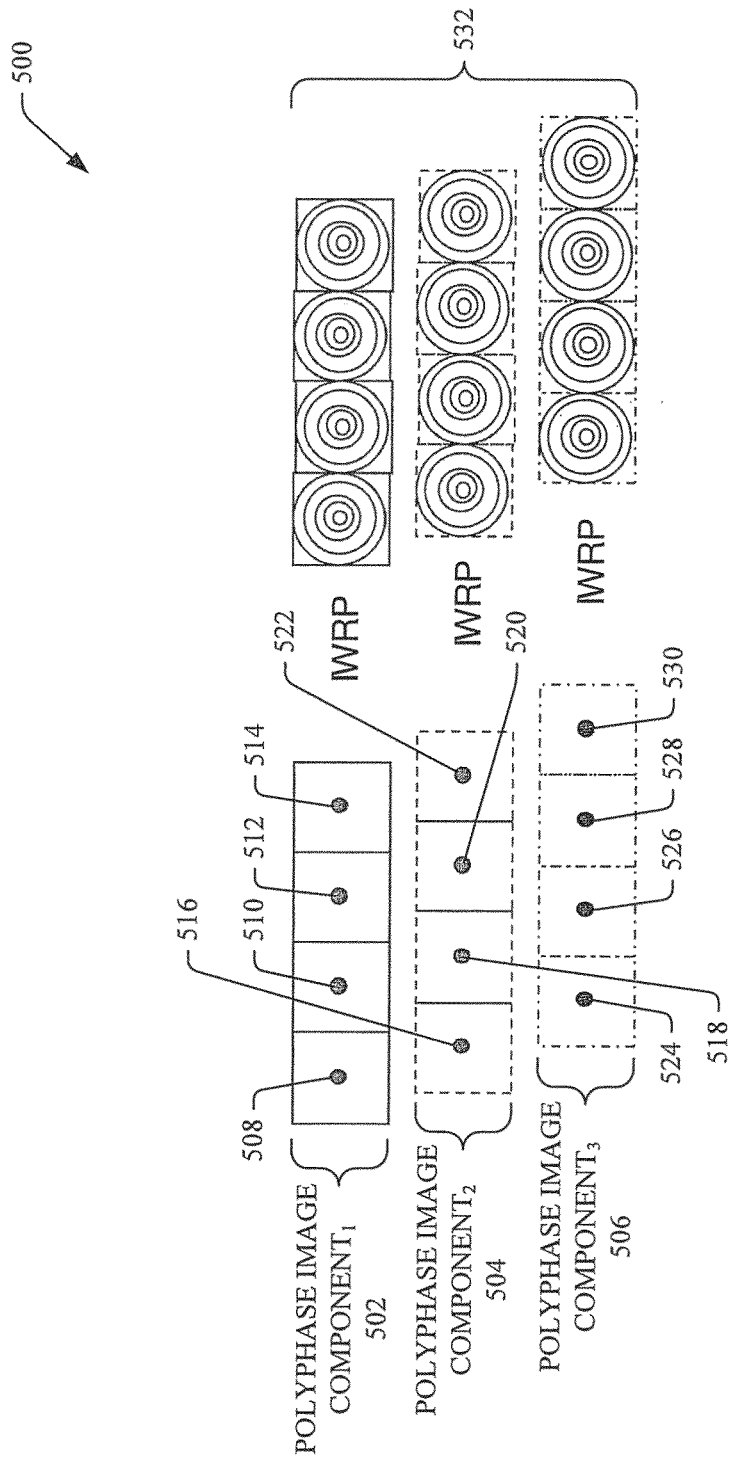
FIG. 5 depicts a diagram of an example polyphase IWRP (P-IWRP) process that can decompose a 3-D image or scene into multiple polyphase components and generate a WRP or an IWRP for each of the polyphase components, in accordance with various aspects and implementations of the disclosed subject matter.

Referring to FIG. 5 (along with FIG. 1), FIG. 5 illustrates a diagram of an example polyphase IWRP (P-IWRP) process 500 that can decompose a 3-D image or scene into multiple polyphase components and generate a WRP or an IWRP for each of the polyphase components, in accordance with various aspects and implementations of the disclosed subject matter. The IWRP process can be near computation free, however, in some instances, the resolution of a hologram potentially may be relatively or undesirably (e.g., unacceptably) low. The HEC 104 can perform the P-IWRP process 500 to facilitate improving resolution of a hologram (e.g., 3-D Fresnel hologram) and corresponding holographic images.

The HEC 104 can decompose or separate a 3-D object scene (e.g., a downsampled 3-D object scene) into a plurality of polyphase image components of the 3-D object scene. For example, as depicted in the P-IWRP process 500, the HEC 104 can decompose or separate a 3-D object scene or image into a plurality of polyphase image components of the 3-D object scene or image. The polyphase image components can include, for example, polyphase image component$_1$ 502, polyphase image component$_2$ 504, and polyphase image component$_3$ 506. The plurality of polyphase image components (e.g., 502, 504, 506, etc.) can respectively comprise a subset of object points, wherein polyphase image component$_1$ 502 can include object point 508, object point 510, object point 512, and object point 514; polyphase image component$_2$ 504 can include object point 516, object point 518, object point 520, and object point 522; and polyphase image component$_3$ 506 can include object point 524, object point 526, object point 528, and object point 530. Each of the object points respectively can be associated with (e.g., contained or centered within) square regions.

For reasons of brevity and clarity, the polyphase image components, polyphase image component$_1$ 502, polyphase image component$_2$ 504, and polyphase image component$_3$ 506, only depict a few consecutive pixels of the 3-D object scene or image, and it is to be appreciated and understood, that the 3-D object scene or image can include more pixels than are depicted in FIG. 5. Further, for reasons of brevity and clarity, the P-IWRP process 500 includes three polyphase image components, however, in accordance with various other implementations, there can be more or less than three polyphase image subcomponents, wherein the number of polyphase image components can be determined by the HEC 104, in accordance with the defined holographic generation criterion(s).

The HEC 104 can generate respective WRPs or IWRPs for each of the polyphase image components. The generation of the respective WRPs or IWRPs for each of the polyphase image components can be a low computation or near computation free process. The HEC 104 can sum the WRPs of the polyphase image components. In certain implementations, the HEC 104 can use a GPU to sum the WRPs of the polyphase image components, for example, using texture blending, which can be a process that can be relatively low in complexity. The HEC 104 can expand and/or interpolate the blended or summed WRPs to generate the 3-D hologram (e.g., full-parallax 3-D Fresnel hologram) that can be used to generate or reconstruct 3-D holographic images that can represent or recreate the original 3-D object scene. As depicted at reference numeral 532 of the P-IWRP process 500, the HEC 104 can interpolate the summed and/or blended WRPs associated with the polyphase image components, polyphase image component$_1$ 502, polyphase image component$_2$ 504, and polyphase image component$_3$ 506, using, for example, 2-D interpolation conducted in the frequency space, to facilitate generating summed and/or blended IWRPs associated with the respective polyphase image components (e.g., 502, 504, 506) to reduce (e.g., fill in or fill up) empty space between the samples associated with the respective object points.

Figure 6:
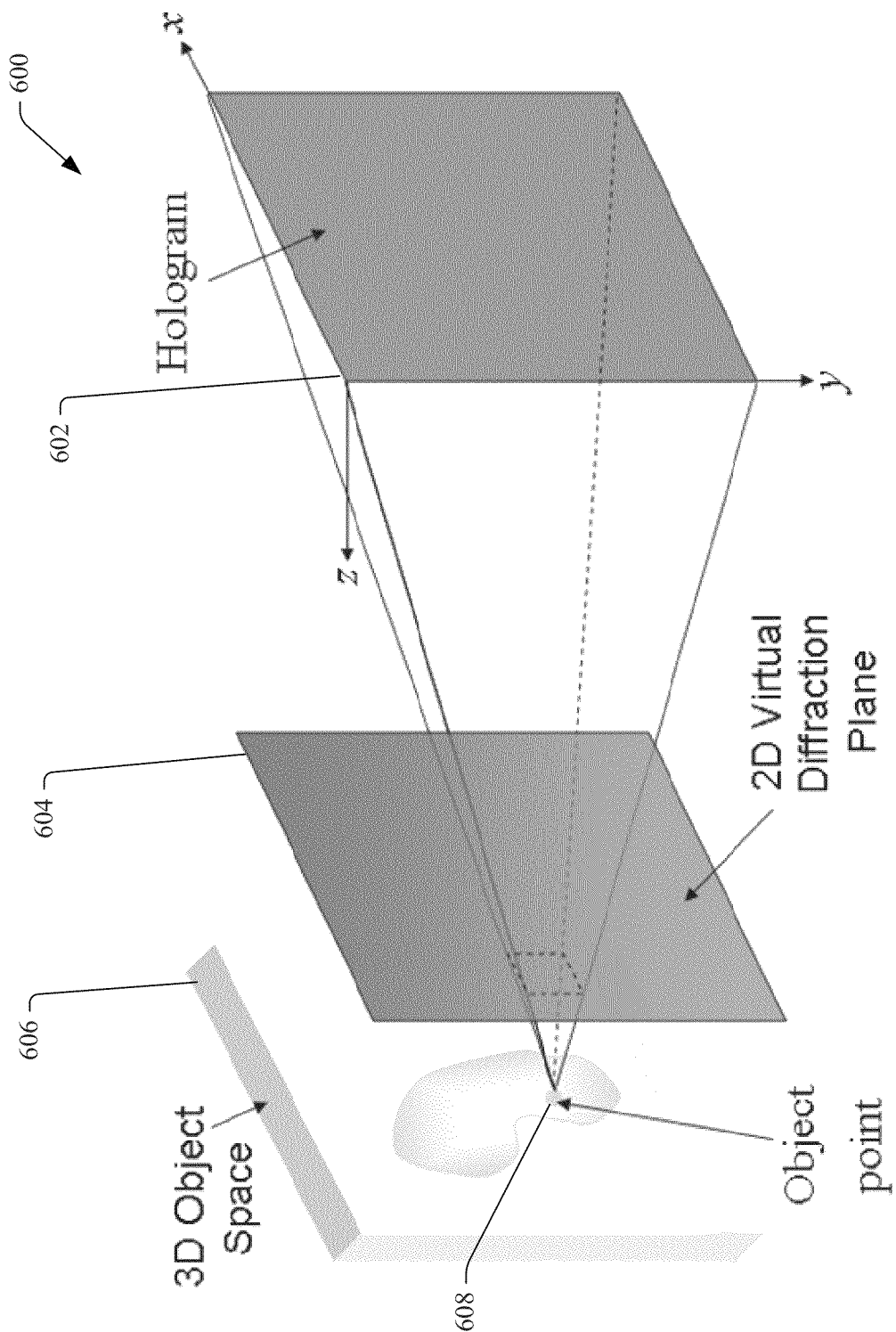
FIG. 6 depicts a diagram of an example spatial relation between a three-dimensional (3-D) object space, a virtual diffraction plane (VDP), and a hologram, in accordance with various aspects of this disclosure.
Figure 7:
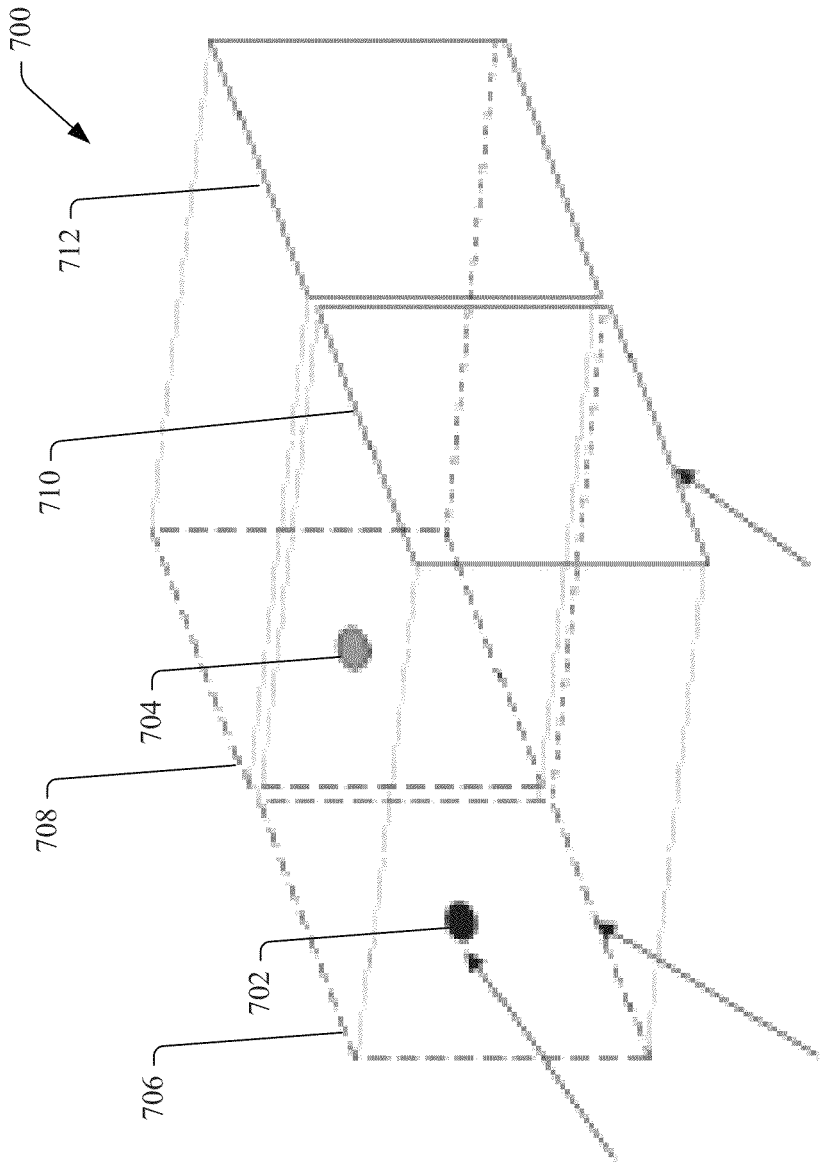
FIG. 7 illustrates a diagram of a set of sample points, in accordance with aspects of this disclosure.

With regard to FIGS. 6 and 7 along with further regard to FIGS. 1 and 2, various other aspects and implementations relating to efficient generation of IWRPs in (e.g., generation of IWRPs in a computational-free or substantially computational-free manner) are disclosed. FIG. 6 depicts a diagram of an example spatial relation 600 between a 3-D object space, a virtual diffraction plane (VDP), and a hologram, in accordance with various aspects of this disclosure. The spatial relation 600 can include a hologram u(x, y) 602 that can be a vertical, 2-D image that can be positioned at the origin. The spatial relation 600 also can include a 2-D VDP $u_w(x, y)$ 604 that can be the same (e.g., identical) or at least substantially the same size as the hologram 602, and can be placed very close to the 3-D object scene, and at a depth $z_w$ from u(x, y). The spatial relation 600 also can include a 3-D object space 606 that can be composed of a set of self-illuminating pixels. The hologram 602, the VDP 604, and the object scene 606 can have the same or at least substantially the same horizontal and vertical extents of X and Y pixels, respectively, as well as the same or at least substantially the same sampling pitch p.

The HEC 104 can employ, for example, three stages to facilitate generation of IWRPs and corresponding holograms. The 3-D object scene 606 can be composed of a 3-D surface. Each point 608 (e.g., object point) of a plurality of points on the 3-D surface, located at horizontal position x and vertical position y, can have an intensity given by I(x, y) (hereinafter also referred to as the scene intensity image or the image scene) and can be located at a distance d(x, y) (e.g., the depth value) normal to the VDP 604. The HEC 104 can derive a scene component of the 3-D object scene 606 from the 3-D surface that has been evenly down-sampled (e.g., decimated) by M times (where M>0) along the horizontal direction, and evenly down-sampled by M times along the vertical direction, wherein in M can be virtually any desired integer or real number. If there is more than one scene component, each of the scene components also can be referred to as a polyphase scene component or a polyphase image component.

The HEC 104 can generate an IWRP on the VDP 604. An IWRP can be composed of either a single IWRP component or a plurality of IWRP components. If an IWRP is composed of a plurality of IWRP components, each IWRP component also can be referred to as a polyphase IWRP component. The HEC 104 can generate each IWRP component from a corresponding scene component in the 3-D object space 606. As such, the number of scene component(s) can be the same as the number of IWRP component(s) generated by the HEC 104.

Each sample point 608 in a scene component can be located in a column position given by the equation:

$$m \cdot M + \mathit{off}_x + \frac{M}{2}.$$

Similarly, each sample point 608 in a scene component can be located in row positions given by the equation:

$$n \cdot M + \mathit{off}_y + \frac{M}{2}$$

where m≥0 and n≥0 are integers, $\mathit{off}_x$ is defined as $$\mathit{off}_x = \frac{v_x \cdot M}{k},$$

where k is an integer that can be equal to the number of scene component(s), $v_x$ is an integer that can be smaller than k, $\mathit{off}_y$ is defined as $$off_y = \frac{v_y \cdot M}{k},$$

where $v_y$ can be an integer that can be smaller than k.

The HEC 104 can derive $off_x$ from $v_x$ and $off_y$ from $v_y$. Different combinations of $off_x$ and $off_y$ can result in different polyphase scene components. If k=1, there can be only a single scene component, and in such a case, both $off_x$ and $off_y$ can be zero. The horizontal position and vertical position of a sample point 608 in a polyphase scene component can be denoted by $x_{m;n;v_x;v_y}$ and $y_{m;n;v_x;v_y}$, respectively, wherein it is to be understood that each polyphase scene component may have different values for $off_x$ and $off_y$.

Referring again briefly to FIG. 2 (along with FIGS. 1 and 6), the example image 200 (e.g., visual image) can include a sampling lattice and square supports, in accordance with aspects of this disclosure. As part of the second stage, the HEC 104 can generate the sampling lattice and square supports (e.g., square regions 208, 210, 212, etc.). A square support (e.g., square regions 208, 210, 212, etc.), as shown in FIG. 2, can be defined for each sample point (e.g., object points 202, 204, 206, etc.) in each polyphase scene component, with the left side $l_{m;n;v_x;v_y}$ and the right side $r_{m;n;v_x;v_y}$ given by $$l_{m;n;v_x;v_y} = x_{m;n;v_x;v_y} - \frac{M}{2}, \text{ and } r_{m;n;v_x;v_y} = x_{m;n;v_x;v_y} + \frac{M}{2} - 1,$$

respectively. Similarly, the top side $t_{m;n;v_x;v_y}$ and bottom side $b_{m;n;v_x;v_y}$ of a square support (e.g., a square region, such as square regions 208, 210, 212, etc.) can be given by $$t_{m;n;v_x;v_y} = y_{m;n;v_x;v_y} - \frac{M}{2}, \text{ and } b_{m;n;v_x;v_y} = y_{m;n;v_x;v_y} + \frac{M}{2} - 1,$$

respectively. For clarity with regard to the description, $off_x$, $off_y$, $v_x$ and $v_y$ are not shown in the FIG. 2, although it is to be understood that FIG. 2 is in part illustrating a single scene component or one of the polyphase scene components. In some implementations, the square supports (e.g., square regions 210 and 212) of adjacent sample points (e.g., object points 204 and 206) can be non-overlapping and touching each other at their respective region boundaries. As the VDP (e.g., 604) can be very close to the scene (e.g., 606), the wavefront contributed by each sample point (e.g., object points 202, 204, 206, etc., of FIG. 2; object point 608, etc., of FIG. 6) on the scene component to the corresponding IWRP component on the VDP can be restricted to a square virtual window which can be aligned with the square support (e.g., square regions 208, 210, 212, etc.), and with side length equal or substantially equal to M, as shown in FIG. 7, which illustrates a diagram of a set (e.g., pair) of sample points 700, in accordance with aspects of this disclosure. The set of sample points 700 can include sample point 702 (e.g., object point) and sample point 704 that can each be associated with a square support, such as square support 706 and square support 708, respectively.

Based on an assumption that the physical separation between adjacent points in the image scene I(x, y), the VDP (e.g., 604), and the hologram (e.g., 602) is identical and equal to p, the wavefront contributed by a single object point (e.g., object point 702 or 704) located at $x_{m;n;v_x;v_y}$ and $y_{m;n;v_x;v_y}$, to the virtual window (e.g., virtual window 710 or 712) can be given by $$u_s(x, y) \mid l_{m;n;v_x;v_y} \leq x \leq r_{m;n;v_x;v_y}, \qquad (1)$$

$$t_{m;n;v_x;v_y} \leq y \leq b_{m;n;v_x;v_y} = I(x_{m;n;v_x;v_y}, y_{m;n;v_x;v_y}) \exp\left(i\frac{2\pi}{\lambda} R_{m;n;v_x;v_y}\right)$$

where $$R_{m;n;v_x;v_y} = \sqrt{(x - x_{m;n;v_x;v_y})^2 p^2 + (y - y_{m;n;v_x;v_y})^2 p^2 + d(x_{m;n;v_x;v_y}, y_{m;n;v_x;v_y})^2}$$

is the distance of the sample object point to the location (x, y) on the VDP (e.g., 604), and λ is the wavelength.

The HEC 104 (or another component) can generate the contribution of a single object point (e.g., 702) located at $x_{m;n;v_x;v_y}$ and $y_{m;n;v_x;v_y}$, to the virtual window (e.g., 710) as follows. The HEC 104 can interpolate, with padding, a confined region within the square support (e.g., 706 and 708, respectively) associated with each object point (e.g., 702 and 704, respectively) (e.g., duplicating of the pixels within each square support with the intensity and depth values of the corresponding sample point). After the interpolation, the HEC 104 can generate the interpolative wavefront on the virtual window (e.g., 710) of the VDP (e.g., 604) corresponding to the square support (e.g., 706) in the object scene, for example, in accordance with the Equations (2a) and (2b) as follows:

$$u_I(x, y, v_x, v_y) \mid l_{m;n;v_x;v_y} \leq x \leq r_{m;n;v_x;v_y}, \qquad (2a)$$

$$t_{m;n;v_x;v_y} \leq y \leq b_{m;n;v_x;v_y} =$$

$$I(x_{m;n;v_x;v_y}, y_{m;n;v_x;v_y}) \times \sum_{\tau_x=-Q_x/2}^{Q_{x/2}-1} \sum_{\tau_y=-Q_{y/2}}^{Q_{y/2}-1}$$

$$\exp\left(i\frac{2\pi}{\lambda} \sqrt{\begin{array}{c}(x - x_{m;n;v_x;v_y} + \tau_x)^2 p^2 + (y - y_{m;n;v_x;v_y} + \tau_y)^2 p^2 + \\ d(x_{m;n;v_x;v_y}, y_{m;n;v_x;v_y})^2\end{array}}\right)$$

$$= G_A(x, y, I(x_{m;n;v_x;v_y}, y_{m;n;v_x;v_y}), d(x_{m;n;v_x;v_y}, y_{m;n;v_x;v_y})) \qquad (2b)$$

The terms $Q_x$ and $Q_y$ can govern the size of the interpolated area, and both quantities can be smaller than M. While not required, in some implementations, $$Q_x = Q_y = \frac{M}{k}.$$

In some implementations, the HEC 104 can interpolate each sample point (e.g., 702, 704, etc.) with padding to a region IR of arbitrary shape within that sample point's corresponding square support (e.g., 706 or 708, etc.). As such, the HEC 104 can determine the corresponding interpolative wavefront on the virtual window, for example, in accordance with the following Equations (3a) and (3b) as follows:

$$u_I(x, y, v_x, v_y) \mid l_{m;n;v_x;v_y} \leq x \leq r_{m;n;v_x;v_y},$$ (3a)

$$t_{m;n;v_x;v_y} \leq y \leq b_{m;n;v_x;v_y} = I(x_{m;n;v_x;v_y}, y_{m;n;v_x;v_y}) \times$$

$$\sum_{\tau_x \in IR \wedge \tau_y \in IR} \exp\left(i\frac{2\pi}{\lambda}\sqrt{\frac{(x-\tau_x)^2 p^2 + (y-\tau_y)^2 p^2 +}{d(x_{m;n}; v_x; v_y, y_{m;n;v_x;v_y})^2}}\right)$$

$$= G'_A(x, y, I(x_{m;n;v_x;v_y}, y_{m;n;v_x;v_y}), d(x_{m;n;v_x;v_y}, y_{m;n;v_x;v_y}))$$ (3b)

The HEC 104 can compose an IWRP component of the collection of all the interpolative wavefront, wherein each can contribute a sample point (e.g., 702 or 704, etc.) in the corresponding scene component.

To facilitate efficiently generating the IWRP and correspond hologram, for finite variations of $I(x_{m;n;v_x;v_y}, y_{m;n;v_x;v_y})$ and $d(x_{m;n;v_x;v_y}, y_{m;n;v_x;v_y})$, the HEC 104 or another component can pre-compute all of the possible combinations of $G_A(x_{m;n;v_x;v_y}, y_{m;n;v_x;v_y})$ (or $G'_A(x_{m;n;v_x;v_y}, y_{m;n;v_x;v_y})$) in advance, and the results of such computations can be stored in the look-up table 106. For example, if the depth $d(x_{m;n;v_x;v_y}, y_{m;n;v_x;v_y})$ and $I(x_{m;n;v_x;v_y}, y_{m;n;v_x;v_y})$ are quantized into $N_d$ and $N_I$ levels, respectively, there can be a total of $N_d \times N_I$ combinations. Consequently, the HEC 104 or another component can generate each virtual window (e.g., 710, 712, etc.) in the IWRP component in a computation-free manner, or at least a substantially computation-free manner, by retrieving, from the look-up table 106, the index corresponding to the value of each pixel of the virtual window (e.g., 710, 712, etc.) during IWRP generation.

The HEC 104 can derive the IWRP from the sum of all the polyphase IWRP components, for example, in accordance with Equation (4) as follows:

$$u_w(x, y) = \sum_{v_x=0}^{k-1} \sum_{v_y=0}^{k-1} u_I(x, y, v_x, v_y)$$ (4)

In some implementations, the HEC 104 can use, for example, the GPU, to facilitate summing the IWRP components as a parallel process.

As part of the third stage, the HEC 104 can expand the IWRP to generate the hologram, for example, in accordance with equation (5) as follows:

$$u(x,y)=KF^{-1}[F[u_w(x,y)] \times F[h(x,y)]],$$ (5)

where $F[\text{"function(s)-to-be-transformed"}]$ and $F^{-1}[\text{"function(s)-to-be-transformed"}]$ can denote a forward Fourier transform and an inverse Fourier transform, respectively, K can be a constant, and $$h(x, y) = \exp\left(i\frac{\pi}{\lambda z_w}(x^2 p^2 + y^2 p^2)\right)$$

can be an impulse function. The process of expanding the IWRP to generate the hologram using, for example, equation (5) also can be referred to as an interpolation process, wherein h(x,y) can be an interpolation filter. With regard to Equation (5), the HEC 104 or another component can generate or pre-compute the term F[h(x, y)] in advance (e.g., prior to generation of the hologram and/or expansion of the IWRP), and hence, during expansion of the IWRP to generate the corresponding hologram, the HEC 104, for example, using the GPU, can compute the forward and the inverse Fourier transform operations (e.g., in accordance with Equation (5)), which can be conducted relatively quickly using the GPU, without having to compute F[h(x, y)], to facilitate expanding the IWRP and generating the corresponding hologram (e.g., 602) in an efficient manner.

The choice of the size of the virtual window (e.g., 710, 712, etc.), as well as the distance between the VDP (e.g., 604) and the 3-D object space (e.g., 606), by the HEC 104 can be flexible and can be determined, for example, on an empirical basis and in accordance with the defined holographic generation criterion(s). The HEC 104 or another component of this disclosure can determine or identify the size of the virtual window (e.g., 710, 712, etc.), and/or the distance between the VDP (e.g., 604) and the 3-D object space (e.g., 606), based at least in part with the guidelines disclosed herein. The HEC 104 or another component can implement one or more of the guidelines and/or one or more defined holographic generation criterion that can be based at least in part on the one or more guidelines. As one guideline, the larger the size of the virtual window (e.g., 710, 712, etc.), the more object wave that can be recorded and, as a result, the better the diffraction efficiency can be, and this can lead to better preservation of the 3-D information in the object space (e.g., 606). However, enlarging the virtual window (e.g., 710, 712, etc.) also can lower the resolution of the scene intensity image. The HEC 104 can use parameter settings, a process(es), etc., that can achieve a desired balance (e.g., acceptable or optimal balance) between the size of the virtual window (e.g., 710, 712, etc.) and the resolution level of the scene intensity image in accordance with the defined holographic generation criterion(s).

As another guideline, the shorter the distance between the VDP (e.g., 604) and the 3-D object space (e.g., 606), the smaller the size of the virtual window (e.g., 710, 712, etc.) that is desirable (e.g., acceptable or necessary) to effectuate a given viewing angle can be. However, it can be desirable (e.g., acceptable or necessary) for the size of the virtual window (e.g., 710, 712, etc.) to be large enough to provide adequate diffraction efficiency. The HEC 104 can use parameter settings, a process(es), etc., that can achieve a desired balance (e.g., acceptable or optimal balance) between the distance between the VDP, the size of the virtual window (e.g., 710, 712, etc.), and the diffraction efficiency, in accordance with the defined holographic generation criterion(s).

With further regard to FIG. 1, the HGC 102 can be associated with (e.g., communicatively connected to) a display component 110. The HGC 102 can provide (e.g., communicate) the 3-D hologram (e.g., full-parallax 3-D Fresnel hologram), in real time or via recorded media (e.g., 2-D media, such as film), to the display component 110. The display component 110 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives.

In accordance with various embodiments, the display component 110 can comprise one or more of a LCOS display, a liquid crystal display (LCD) (e.g., a high resolution LCD), an autostereoscopic display (e.g., a multiple-section autostereoscopic display (MSAD)), a holographic 3-D television (TV) display, an SLM, or other desired display suitable for displaying holographic images (e.g., 3-D Fresnel holographic images), to facilitate display (e.g., real time display) of holographic images.

Additionally and/or alternatively, if desired, a hologram can be produced onto a desired material (e.g., onto film using photographic techniques) so that there is a hard copy of the hologram that can be used to reproduce the 3-D holographic images at a desired time. Also, it is to be appreciated and understood that the holographic output (e.g., 3-D hologram and/or corresponding 3-D holographic images) can be communicated over wired or wireless communication channels to the display component 110 or other display components (e.g., remote display components, such as a 3-D TV display) to facilitate generation (e.g., reconstruction, reproduction) and display of the 3-D holographic images of the 3-D object scene) so that the 3-D holographic images can be presented to desired observers.

The system 100, by employing the HGC 102 including the HEC 104, and/or other systems, methods, devices, processes, techniques, etc., of the disclosed subject matter can have a number of advantages over conventional systems, methods, and techniques for hologram generation. For instance, the system 100, by employing the HGC 102 including the HEC 104, and/or other systems, methods, devices, processes, techniques, etc., of the disclosed subject matter can generate full-parallax 3-D digital Fresnel holograms; can have a computational time that can be significantly faster than conventional hologram generation techniques; can apply the fast computation of the disclosed subject matter in relation to a relatively large number of object points (e.g., 4 million or more object points); can allow for a flexible tradeoff between resolution of a reconstructed 3-D holographic image and computation efficiency; can compensate for, reduce, or overcome sparseness that can be caused by downsampling of a 3-D object scene while using only a relatively small amount (e.g., a negligible amount) of computation time; can be relatively low in complexity; and can be realized and implemented with software and/or hardware means.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, educational applications or purposes, a holographic studio, scientific research, live stage or concerts, etc.

Figure 8:
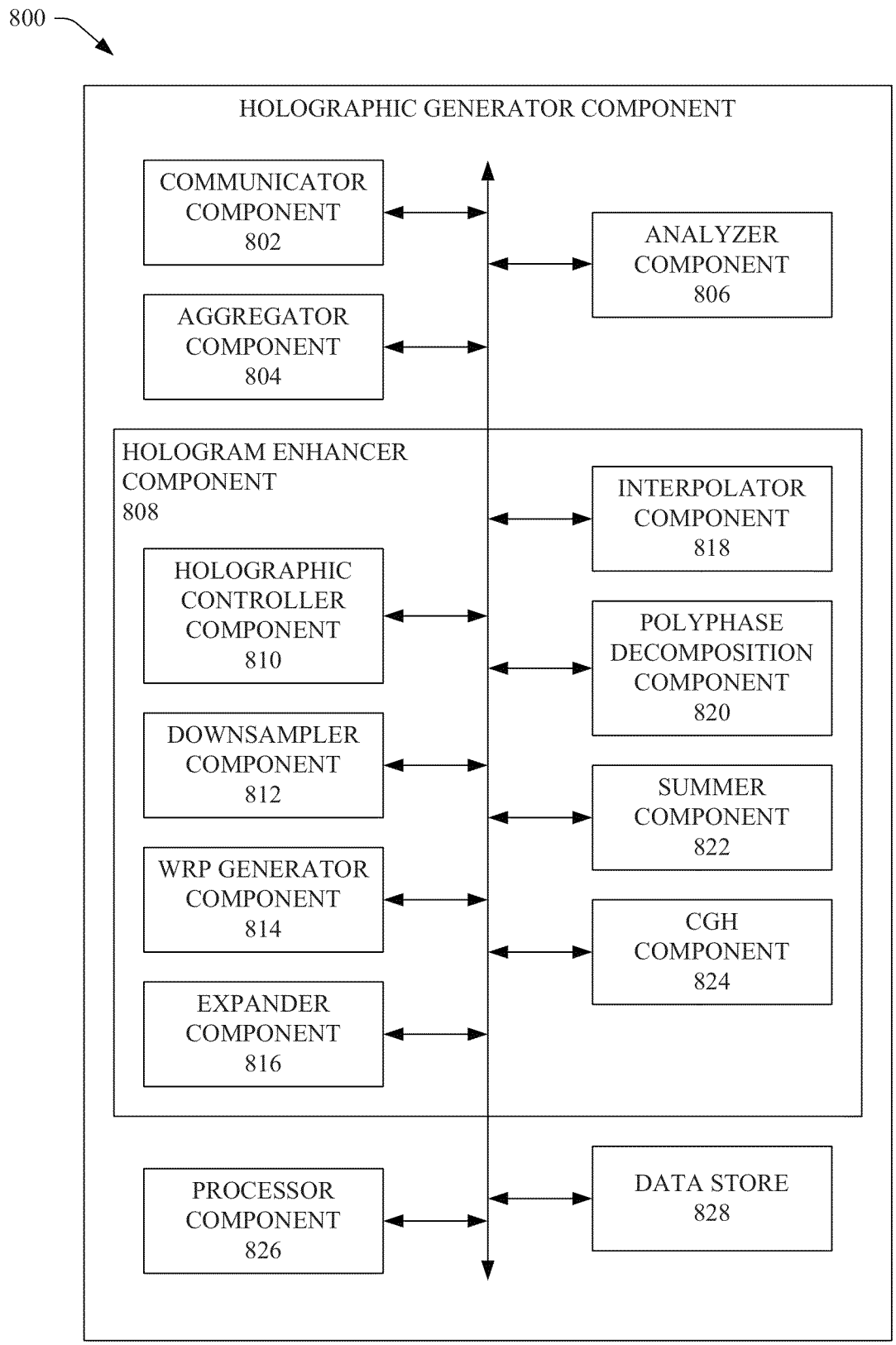
FIG. 8 depicts a block diagram of an example holographic generator component that can efficiently generate a full-parallax 3-D hologram(s) of a real or synthetic 3-D object scene(s) in accordance with various aspects and implementations of the disclosed subject matter.

FIG. 8 illustrates a block diagram of an example HGC 800 that can efficiently generate a full-parallax three-dimensional (3-D) hologram(s) (e.g., 3-D Fresnel hologram(s)) of a real or synthetic 3-D object scene(s) in accordance with various aspects and implementations of the disclosed subject matter. The HGC 800 can include a communicator component 802 that can be used to communicate (e.g., transmit, receive) information between the HGC 800 and other components (e.g., display component(s), scene capture device(s), processor component(s), user interface(s), data store(s), etc.). The information can include, for example, a real or synthetic 3-D object scene, holograms or holographic images, information relating defined holographic generation criterion(s), information relation to an algorithm(s) that can facilitate generation of holograms or holographic images, etc.

The HGC 800 can comprise an aggregator component 804 that can aggregate data received (e.g., obtained) from various entities (e.g., scene capture device(s), display component(s), processor component(s), user interface(s), data store(s), etc.). The aggregator component 804 can correlate respective items of data based at least in part on type of data, source of the data, time or date the data was generated or received, object point with which the data is associated, WRP or IWRP with which data is associated, polyphase image component with which data is associated, etc., to facilitate processing of the data (e.g., analyzing of the data by the analyzer component 806).

The analyzer component 806 can analyze data to facilitate identifying elements (e.g., object points, windows, features, etc.) of a 3-D object scene, downsampling a 3-D object scene, generating WRPs or IWRPs, expanding a WRP or IWRP into a hologram, interpolating a WRP, etc., and can generate analysis results, based at least in part on the data analysis. For example, the analyzer component 806 can analyze information relating to object points of a 3-D object scene or image to facilitate interpolating a WRP to generate an IWRP for the 3-D object scene or image. The analyzer component 806 can provide analysis results relating to, for example, an HEC 808 or another component (e.g., processor component 824, data store 826, etc.). Based at least in part on the results of this analysis, the HGC 800 (e.g., using the HEC 808) can interpolate a WRP of the 3-D object scene or image to generate the IWRP for the 3-D object scene or image, in accordance with defined holographic generation criterion(s), as more fully described herein.

The HGC 800 can include the HEC 808 that can generate a full-parallax digital 3-D hologram (e.g., Fresnel hologram) to facilitate generating or reconstructing full-parallax digital 3-D holographic images (e.g., Fresnel holographic images) that can represent or recreate the original real or synthetic 3-D object scene, as more fully disclosed herein. The HEC 808 can comprise, for example, a holographic controller component 810, a downsampler component 812, a WRP generator component 814, an expander component 816, an interpolator component 818, a polyphase decomposition component 820, a summer component 822, and a CGH component 824.

The holographic controller component 810 can control operations relating to generating a 3-D hologram (e.g., full-parallax 3-D Fresnel hologram) and/or corresponding 3-D holographic images. The holographic controller component 810 can facilitate controlling operations being performed by various components of the HEC 808, controlling data flow between components of the HEC 808, etc.

The downsampler component 812 can downsample a 3-D object scene by a defined downsampling factor, in accordance with the defined holographic generation criterion(s). The defined holographic generation criterion(s) (e.g., for identifying, determining, or selecting the defined downsampling factor) can relate to, for example, resolution of the original image of the 3-D object scene, desired resolution of the holographic image associated with the 3-D object scene, resolution of the display device(s) that will be or is expected to be displaying the holographic image, available computational resources to generate the hologram or associated holographic image, available amount of time to generate the hologram or associated holographic image, etc.

The WRP generator component 814 can generate WRPs (intermediate object wavefront recording planes) or IWRPs for a downsampled 3-D object scene to facilitate generating holograms, as more fully disclosed herein. The WRP generator component 814 can derive a WRP from the accumulation of contributions from each sampled object point of a downsampled 3-D object scene, wherein each sampled object point can cast a window of fringe patterns.

The expander component 816 can expand a WRP associated with a 3-D object scene into a hologram (e.g., a full-parallax 3-D Fresnel hologram) that can represent the 3-D object scene, as more fully disclosed herein. The expander component 816 can expand the WRP to a hologram using, for example, a forward and an inverse 2-D FFT, as more fully disclosed herein. In some implementations, as part of the expansion of the WRP to a hologram, the interpolator component 818 can use interpolation, such as 2-D interpolation, that can be conducted in the frequency space to facilitate expansion and interpolation of the WRP to generate the hologram. In accordance with various implementations, the HEC 808 (e.g., the expander component 816 and/or interpolator component 818) can use a GPU and/or an FPGA to facilitate expanding the WRP to a hologram, interpolating the WRP, and/or performing other operations associated with generating the hologram.

The polyphase decomposition component 820 can decompose or separate a 3-D object scene into a plurality of polyphase image components. The polyphase decomposition component 820 can decompose or separate the 3-D object scene into the plurality of polyphase image components such that they can have a same (e.g., an identical) resolution, wherein the polyphase image components can be translated by a relatively small displacement such that the sampling lattices can be non-overlapping. The WRP generator component 814 (and/or the interpolator component 818) can generate WRPs or IWRPs for each polyphase image component.

The summer component 822 that can sum the WRPs or IWRPs of the polyphase image components. In certain implementations, the summer component 822 can use a GPU and/or an FPGA to sum the WRPs or IWRPs of the polyphase image components, for example, using texture blending. The expander component 816 and/or interpolator component 818 can be used to expand the summed or blended WRPs into a hologram, wherein the interpolator component 818 can interpolate the summed or blended WRPs using, for example, 2-D interpolation that can be conducted in the frequency space, to compensate for or reduce (e.g., fill in or fill up) empty space between the samples associated with the respective object points.

In some embodiments, the CGH component 824 can be used to generate a synthesized 3-D object scene. The synthesized 3-D object scene can be, for example, a model of a 3-D object scene that does not actually exist in the real world. The CGH component 824 also can generate a hologram file that can be used by the HGC 800 to generate a hologram from the synthesized 3-D object scene.

The HGC 800 also can comprise a processor component 826 that can operate in conjunction with the other components (e.g., communicator component 802, aggregator component 804, analyzer component 806, HEC 808, etc.) to facilitate performing the various functions of the HGC 800. The processor component 826 can employ one or more processors (e.g., CPUs, GPUs, FPGAs, etc.), microprocessors, or controllers that can process data, such as information (e.g., visual information) relating to a 3-D object scene, holographic data, data relating to parameters associated with the HGC 800 and associated components, etc., to facilitate generating holograms (e.g., full-parallax 3-D Fresnel holograms) and corresponding holographic images representative of a 3-D object scene; and can control data flow between the HGC 800 and other components associated with the HGC 800.

In yet another aspect, the HGC 800 can contain a data store 828 that can store data structures (e.g., user data, metadata); code structure(s) (e.g., modules, objects, classes, procedures), commands, or instructions; one or more look-up tables; information relating to object points, WRPs, and/or IWRPs; information relating to (e.g., representative of) a 3-D object scene; holographic data; parameter data; and so on. In an aspect, the processor component 826 can be functionally coupled (e.g., through a memory bus) to the data store 828 in order to store and retrieve information desired to operate and/or confer functionality, at least in part, to the communicator component 802, aggregator component 804, analyzer component 806, HEC 808, etc., and/or substantially any other operational aspects of the HGC 800. It is to be appreciated and understood that the various components of the HGC 800 can communicate information between each other and/or between other components associated with the HGC 800 as desired to carry out operations of the HGC 800. It is to be further appreciated and understood that respective components (e.g., communicator component 802, aggregator component 804, analyzer component 806, HEC 808, etc.) of the HGC 800 each can be a stand-alone unit, can be included within the HGC 800 (as depicted), can be incorporated within another component of the HGC 800 (e.g., HEC 808) or component separate from the HGC 800, and/or virtually any suitable combination thereof, as desired.

It is to be appreciated and understood that, in accordance with various other aspects and embodiments, the HGC 800 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3-D object scene and/or a 3-D hologram), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 9:
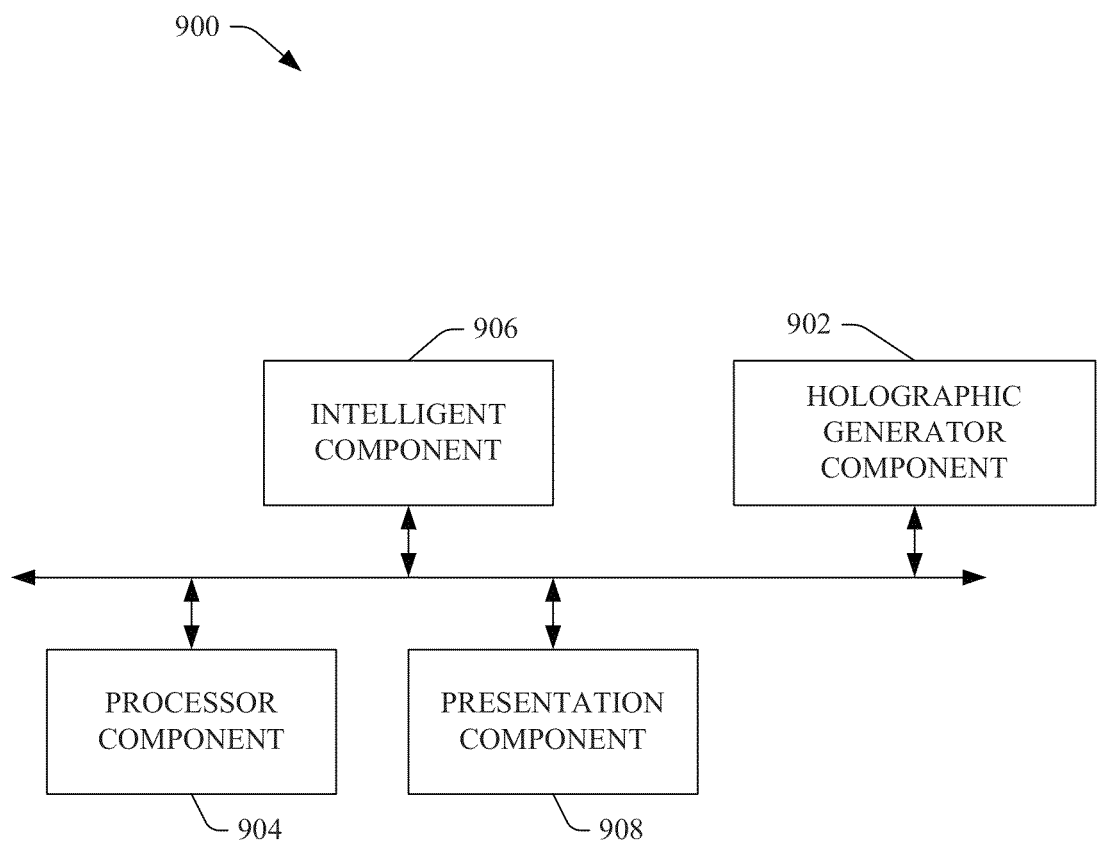
FIG. 9 illustrates a block diagram of a system that can employ intelligence to facilitate generation of a full-parallax 3-D hologram of a real or synthetic 3-D object scene in accordance with an embodiment of the disclosed subject matter.

Referring to FIG. 9, depicted is a block diagram of a system 900 that can employ intelligence to facilitate generation of a full-parallax 3-D hologram (e.g., 3-D Fresnel hologram) of a real or synthetic 3-D object scene in accordance with an embodiment of the disclosed subject matter. The system 900 can include an HGC 902 that can desirably generate a hologram (e.g., sequence of 3-D holographic images) that can represent a 3-D object scene (e.g., real or computer-synthesized 3-D object scene from multiple different viewing perspectives of a 3-D object scene that can correspond to multiple different viewing perspectives of the 3-D object scene, as more fully disclosed herein. It is to be appreciated that the HGC 902 can be the same or similar as respective components (e.g., respectively named components), and/or can contain the same or similar functionality as respective components, as more fully described herein. The HGC 902 can include an HEC (not shown in FIG. 9; e.g., as depicted in FIGS. 1 and 8 and described herein) that can generate a full-parallax digital 3-D hologram (e.g., Fresnel hologram) to facilitate generating or reconstructing full-parallax digital 3-D holographic images (e.g., Fresnel holographic images) that can represent or recreate the original real or synthetic 3-D object scene, as more fully disclosed herein.

The system 900 can further include a processor component 904 that can be associated with (e.g., communicatively connected to) the HGC 902 and/or other components (e.g., components of system 900) via a bus. In accordance with an embodiment of the disclosed subject matter, the processor component 904 can be an applications processor(s) that can manage communications and run applications. For example, the processor component 904 can be a processor that can be utilized by a computer, mobile computing device, personal data assistant (PDA), or other electronic computing device.

The processor component 904 can generate commands in order to facilitate generating holograms and/or displaying of holographic image of a 3-D object scene from multiple different viewing perspectives corresponding to the multiple different viewing perspectives of the 3-D object scene obtained or created by the HGC 902, modifying parameters associated with the HGC 902, etc.

The system 900 also can include an intelligent component 906 that can be associated with (e.g., communicatively connected to) the HGC 902, the processor component 904, and/or other components associated with system 900 to facilitate analyzing data, such as current and/or historical information, and, based at least in part on such information, can make an inference(s) and/or a determination(s) regarding, for example, generation of a 3-D hologram and/or 3-D holographic image based at least in part on a 3-D object scene, setting of parameters associated with the HGC 902 and associated components, etc.

For example, based in part on current and/or historical evidence, the intelligent component 906 can infer a downsampling factor to use in downsampling a 3-D object scene, a type of expansion or interpolation process to use in generating a 3-D hologram of a 3-D object scene, whether windows associated with an image are to overlap (e.g., partially overlap) and/or to what extent windows are to overlap, respective parameter values of one or more parameters to be used with regard to operations by the HGC 902, etc.

In an aspect, the intelligent component 906 can communicate information related to the inferences and/or determinations to the HGC 902. Based at least in part on the inference(s) or determination(s) with respect to such data by the intelligent component 906, the HGC 902 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 902, etc.

It is to be understood that the intelligent component 906 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 900 also can include a presentation component 908, which can be connected with the processor component 904. The presentation component 908 can provide various types of user interfaces to facilitate interaction between a user and any component coupled to the processor component 904. As depicted, the presentation component 908 is a separate entity that can be utilized with the processor component 904 and associated components. However, it is to be appreciated that the presentation component 908 and/or similar view components can be incorporated into the processor component 904 and/or a stand-alone unit. The presentation component 908 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 904.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 902 and/or other components, can be situated or implemented on a single integrated-circuit chip. In accordance with another embodiment, the HGC 902, and/or other components, can be implemented on an application-specific integrated-circuit (ASIC) chip. In yet another embodiment, the HGC 902 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
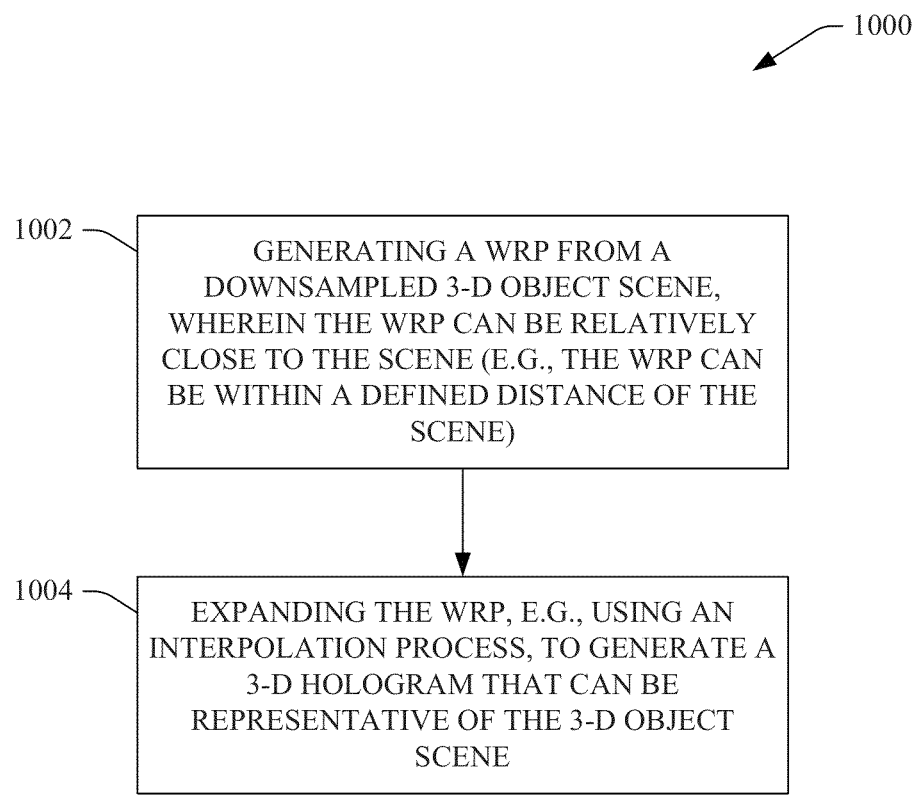
FIG. 10 illustrates a flow diagram of an example method for efficiently generating a 3-D hologram(s) of a real or synthetic 3-D object scene(s) in accordance with various embodiments and aspects of the disclosed subject matter.
Figure 11:
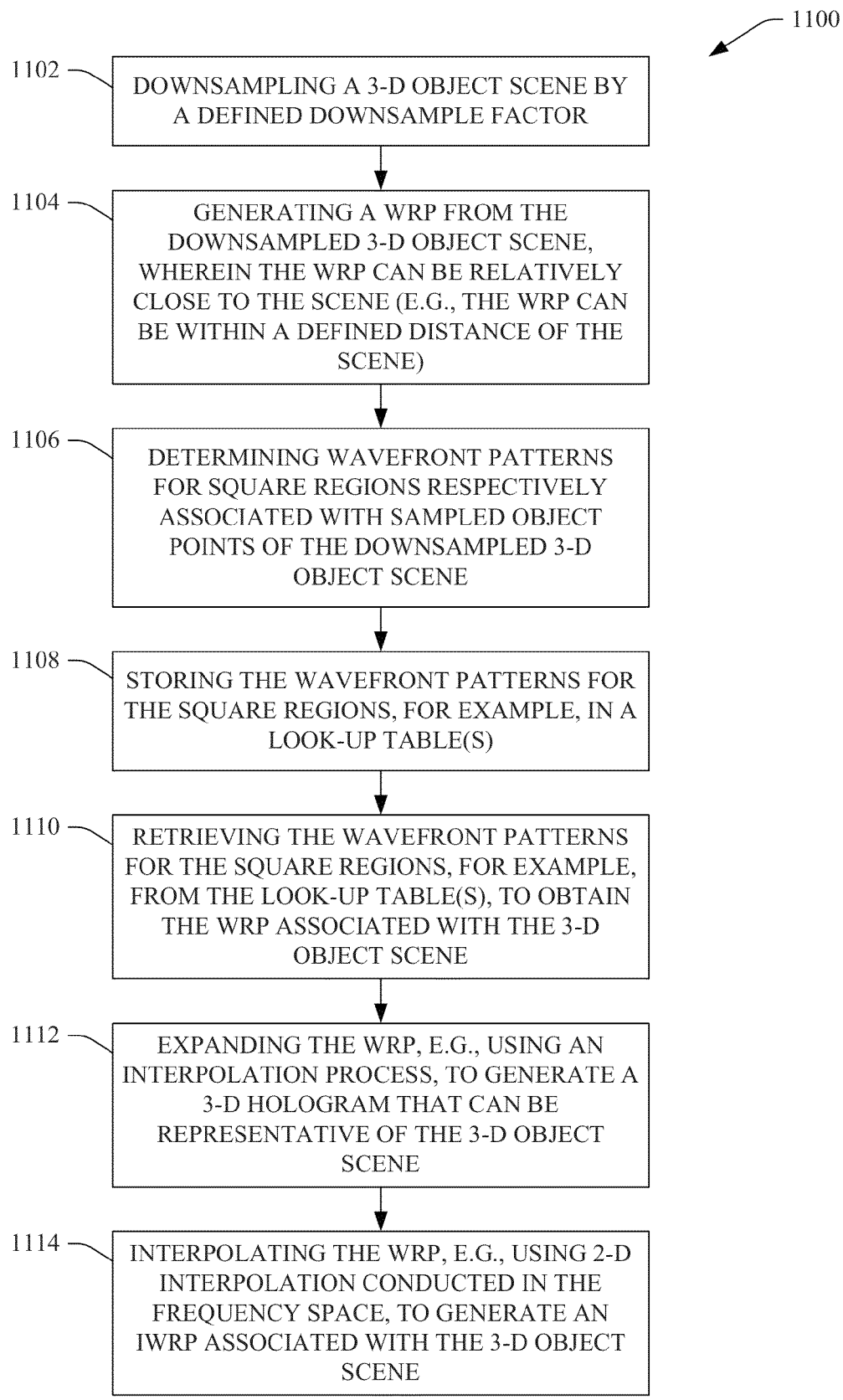
FIG. 11 depicts a flow diagram of another example method for efficiently generating a 3-D hologram(s) of a real or synthetic 3-D object scene(s) in accordance with various embodiments and aspects of the disclosed subject matter.
Figure 12:
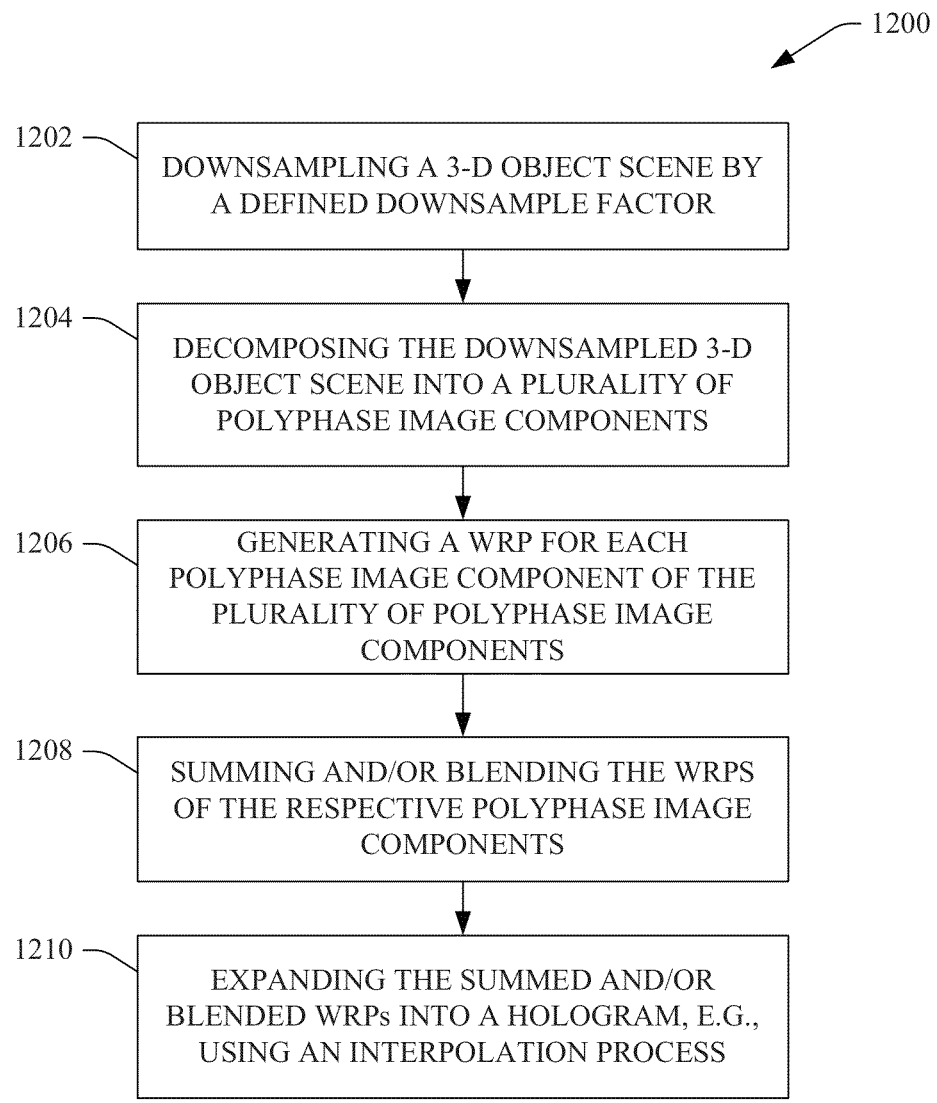
FIG. 12 depicts a flow diagram of an example method for using a polyphase IWRP process to efficiently generate a 3-D hologram(s) of a real or synthetic 3-D object scene(s) in accordance with various embodiments and aspects of the disclosed subject matter.

FIGS. 10-12 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 10, illustrated is a flow diagram of an example method 1000 for efficiently generating a 3-D hologram(s) (e.g., full-parallax 3-D Fresnel hologram(s)) of a real or synthetic 3-D object scene(s) in accordance with various embodiments and aspects of the disclosed subject matter. At 1002, a WRP (intermediate object wavefront recording plane) can be generated from a downsampled 3-D object scene, wherein the WRP can be relatively close to the scene (e.g., the WRP can be within a defined distance of the scene). An HGC can comprise an HEC that can downsample a 3-D object scene by a defined downsampling factor to generate a downsampled 3-D object scene. The HEC can generate the WRP from the downsampled 3-D object scene. The HEC can derive the WRP from the accumulation of contributions from each sampled object point of the downsampled 3-D object scene, wherein each sampled object point can cast a window of fringe patterns. In some implementations, adjacent windows can be partially overlapping with each other. The HEC can generate (e.g., pre-compute, pre-determine) wavefront patterns for each square region and can store the wavefront patterns in a look-up table(s). When the HEC desires to obtain the WRP during the hologram generation process, the HEC can access the wavefront patterns from the look-up table(s) to obtain the WRP in a relatively low-computation manner, as more fully disclosed herein.

At 1004, the WRP can be expanded, for example, using an interpolation process, to generate a 3-D hologram (e.g., full-parallax 3-D Fresnel hologram) that can be representative of the 3-D object scene. The HEC can expand and/or or convert the WRP to generate the 3-D hologram. In some implementations, as part of the expansion process, the HEC can perform the interpolation process (e.g., 2-D interpolation conducted in the frequency space) to interpolate the WRP to generate an IWRP in relation to the 3-D object scene, as more fully disclosed herein.

Turning to FIG. 11, illustrated is a flow diagram of another example method 1100 for efficiently generating a 3-D hologram(s) (e.g., full-parallax 3-D Fresnel hologram(s)) of a real or synthetic 3-D object scene(s) in accordance with various embodiments and aspects of the disclosed subject matter. At 1102, a 3-D object scene can be downsampled by a defined downsample factor. The HGC can receive a real or synthesized 3-D object scene, or can generate a synthesized 3-D object scene. The HGC can include an HEC that can downsample the 3-D object scene by the defined downsampling factor, as more fully disclosed herein.

At 1104, a WRP can be generated from the downsampled 3-D object scene, wherein the WRP can be relatively close to the scene (e.g., the WRP can be within a defined distance of the scene). The HEC can generate the WRP from the downsampled 3-D object scene. The HEC can derive the WRP from the accumulation of contributions from each sampled object point of the downsampled 3-D object scene, wherein each sampled object point can cast a window of fringe patterns. In some implementations, adjacent windows can be partially overlapping with each other.

At 1106, wavefront patterns for square regions respectively associated with sampled object points of the downsampled 3-D object scene can be determined. The HEC can determine (e.g., pre-determine, pre-compute) wavefront patterns for each of the square regions. At 1108, the wavefront patterns for the square regions can be stored, for example, in a look-up table(s). The HEC can store the wavefront patterns in the look-up table(s) for use at a desired time during the hologram generation process.

At 1110, the wavefront patterns for the square regions can be retrieved, for example, from the look-up table(s), to obtain the WRP associated with the 3-D object scene. When the HEC desires to obtain the WRP during the hologram generation process, the HEC can access the wavefront patterns from the look-up table(s) to obtain the WRP in a manner that can involve a relatively low amount of computation, as more fully disclosed herein.

At 1112, the WRP can be expanded, for example, using an interpolation process, to generate a 3-D hologram (e.g., full-parallax 3-D Fresnel hologram) that can be representative of the 3-D object scene. The HEC can expand the WRP to generate the 3-D hologram. At 1114, the WRP can be interpolated, for example, using 2-D interpolation that can be conducted in the frequency space, to generate an IWRP associated with the 3-D object scene. As part of the expansion process, the HEC can perform the interpolation process to interpolate the WRP to generate an IWRP in relation to the 3-D object scene, as more fully disclosed herein FIG. 12 depicts an example method 1200 for using a polyphase IWRP process to efficiently generate a 3-D hologram(s) (e.g., full-parallax 3-D Fresnel hologram(s)) of a real or synthetic 3-D object scene(s) in accordance with various embodiments and aspects of the disclosed subject matter. At 1202, a 3-D object scene can be downsampled by a defined downsample factor. The HGC can receive a real or synthesized 3-D object scene, or can generate a synthesized 3-D object scene. The HGC can comprise an HEC that can downsample the 3-D object scene by the defined downsampling factor, as more fully disclosed herein.

At 1204, the downsampled 3-D object scene can be decomposed into a plurality of polyphase image components. The HEC can decompose or separate the downsampled 3-D object scene into the plurality of polyphase image components comprising different polyphase image components. The respective polyphase image components can have a same resolution, but can be translated by a defined (e.g., relatively small) displacement such that sampling lattices can be non-overlapping.

At 1206, a WRP can be generated for each polyphase image component of the plurality of polyphase image components. The HEC can generate a WRP for each polyphase image component associated with the downsampled 3-D object scene. With regard to a WRP associated with a polyphase image component, the HEC can derive the WRP from the accumulation of contributions from each sampled object point of the downsampled 3-D object scene in relation to that polyphase image component, wherein each sampled object point can cast a window of fringe patterns. In some implementations, adjacent windows can be partially overlapping with each other.

At 1208, the WRPs of the respective polyphase image components can be summed and/or blended. The HEC can sum and/or blend the WRPs of the respective polyphase image components. In some implementations, the HEC can use a GPU and/or an FPGA to sum and/or blend the WRPs of the respective polyphase image components using texture blending.

At 1210, the summed and/or blended WRPs can be expanded into a hologram, for example, using an interpolation process. For instance, the HEC can expand the summed and/or blended WRPs into a hologram (e.g., full-parallax 3-D Fresnel hologram) using the interpolation process. During the expansion of the summed and/or blended WRPs, the HEC can perform, for example, 2-D interpolation conducted in the frequency space on the summed and/or blended WRPs to generate summed and/or blended IWRPs to facilitate generating the hologram, as more fully disclosed herein. The interpolation process can facilitate compensating for or reducing (e.g., filling in or filling up) empty space between the samples associated with the respective object points of the summed and/or blended WRPs.

Figure 13:
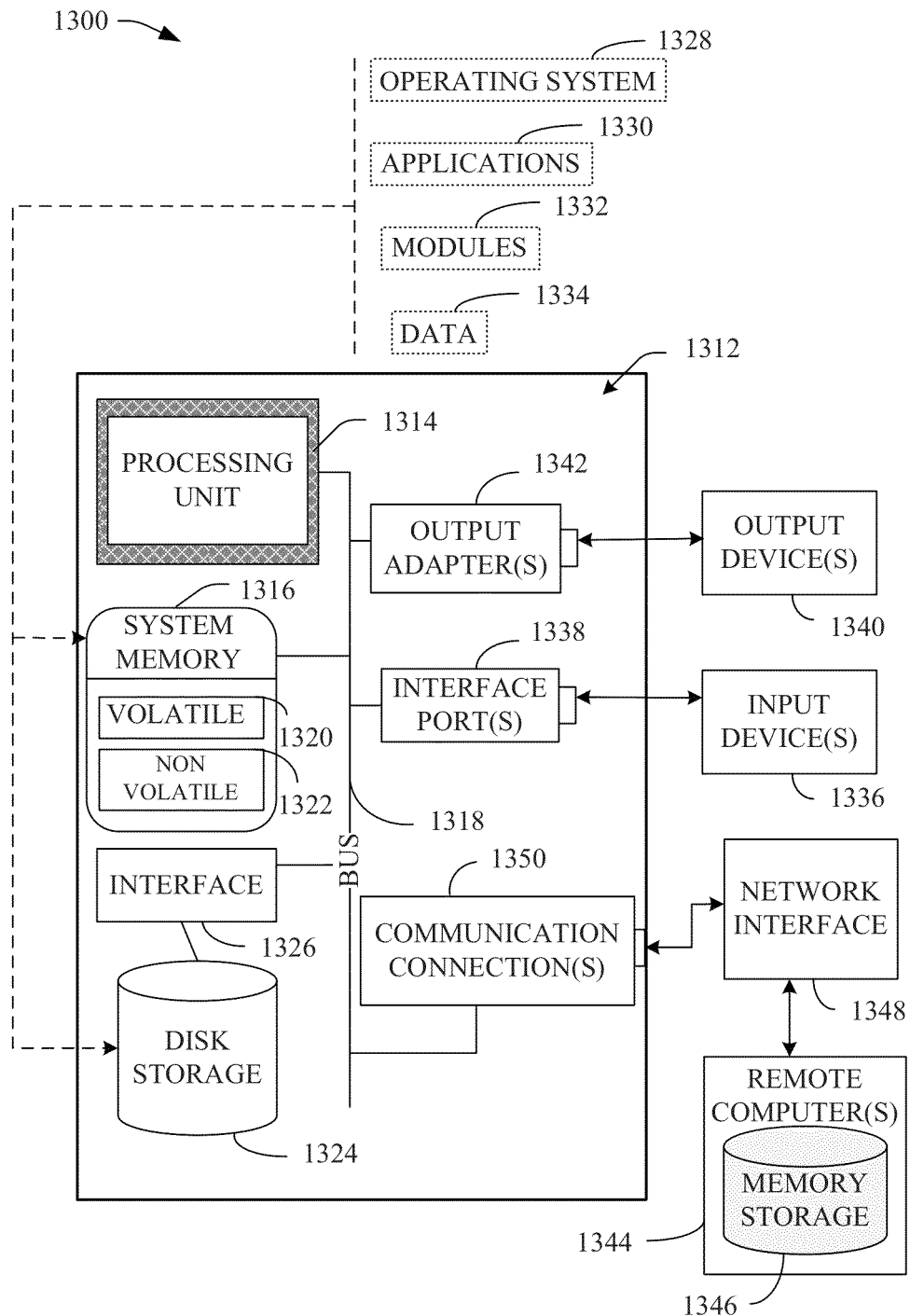
FIG. 13 is a schematic block diagram illustrating a suitable operating environment.
Figure 14:
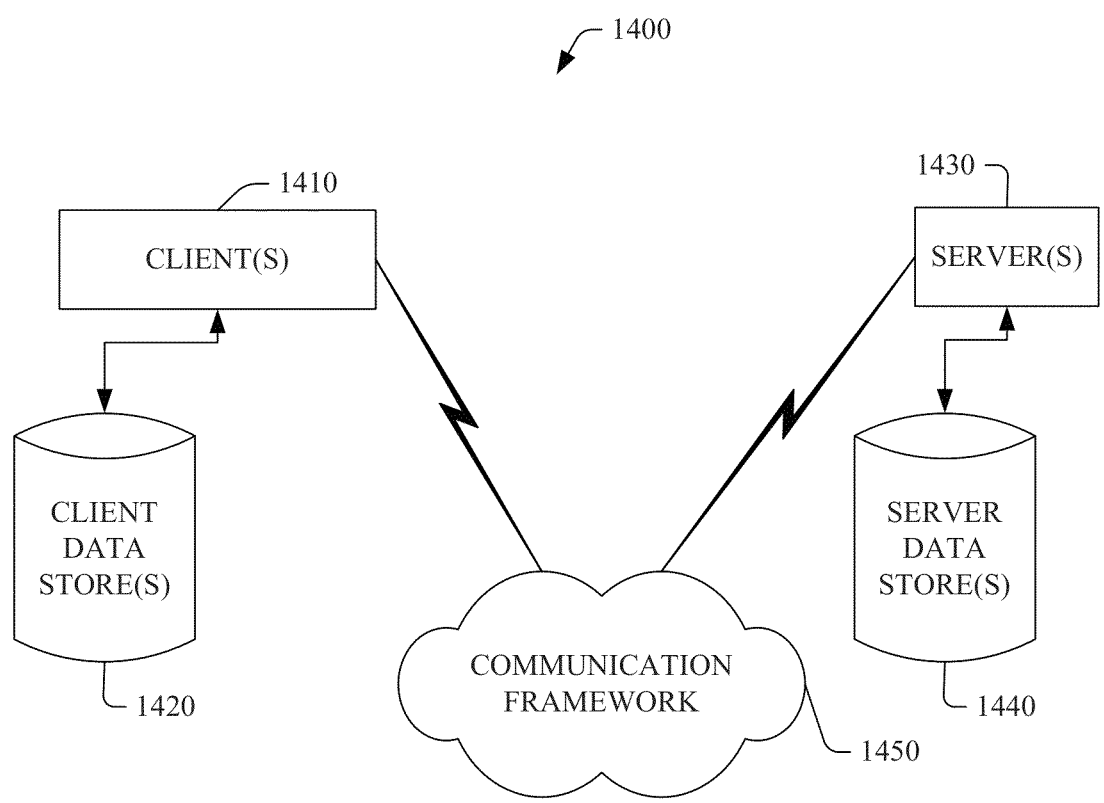
FIG. 14 is a schematic block diagram of a sample-computing environment.
Figure 15:
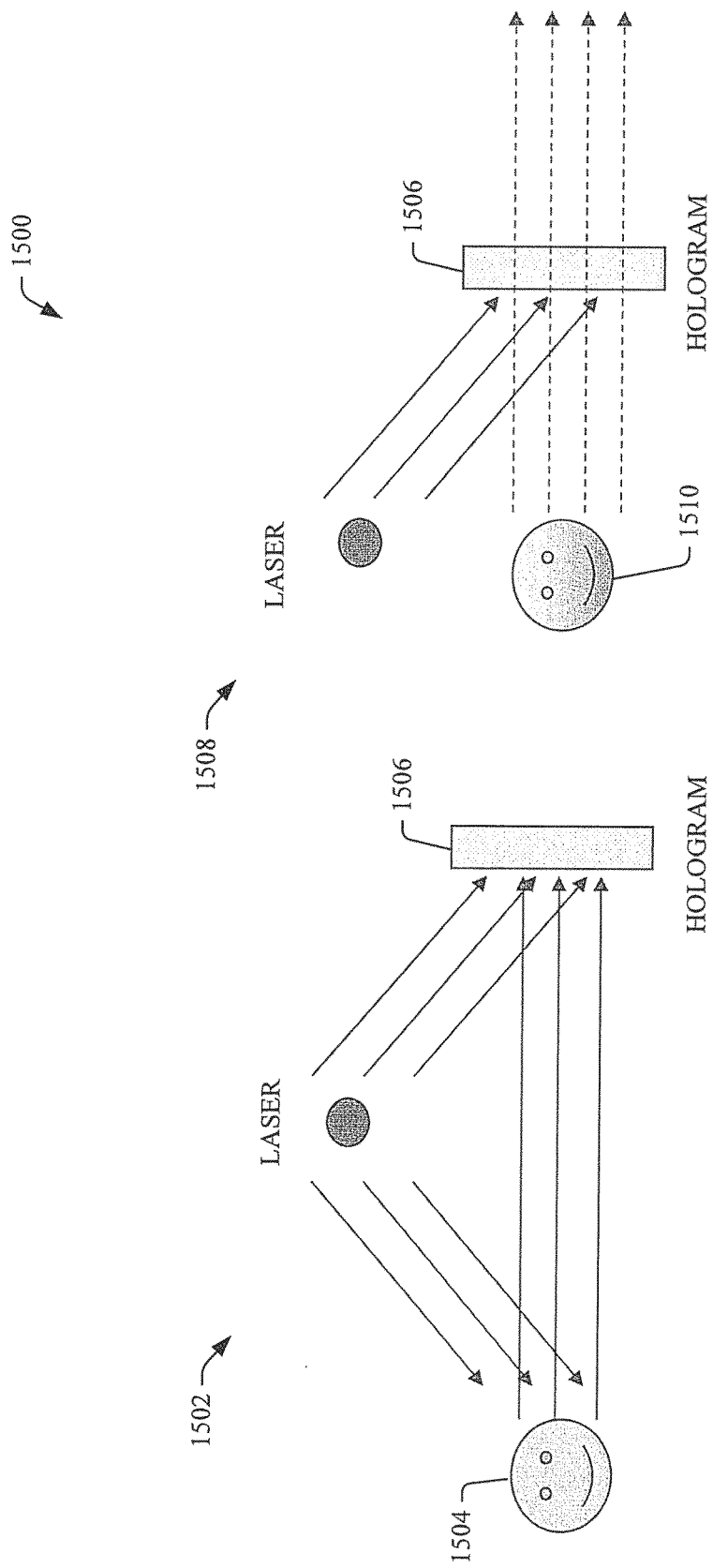
FIG. 15 depicts a diagram of an example optical holography process for generation and use of a hologram to reproduce a 3-D object scene from two-dimensional media.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 13, a suitable environment 1300 for implementing various aspects of the claimed subject matter includes a computer 1312. The computer 1312 includes a processing unit 1314, a system memory 1316, and a system bus 1318. It is to be appreciated that the computer 1312 can be used in connection with implementing one or more of the systems or components (e.g., HGC, HEC, etc.) shown and described in connection with, for example, FIGS. 1-9. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/nonvolatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326).

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample-computing environment 1400 with which the subject disclosure can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the subject disclosure, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1420 that can be employed to store information local to the client(s) 1410. Similarly, the server(s) 1430 are operatively connected to one or more server data store(s) 1440 that can be employed to store information local to the servers 1430.

It is to be appreciated and understood that components (e.g., holographic generator component, hologram enhancer component, expander component, interpolator component, processor component, look-up table, data store, display component, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
  at least one memory that stores computer executable components; and
  at least one processor that facilitates execution of the computer executable components stored in the at least one memory, the computer executable components, comprising:
    a holographic generator component that generates an intermediate object wavefront recording plane on a virtual diffraction plane from a downsampled three-dimensional object scene, wherein the intermediate object wavefront recording plane is within a defined distance of the downsampled three-dimensional object scene; and
    a hologram enhancer component that expands the intermediate object wavefront recording plane to generate a three-dimensional hologram representative of a three-dimensional object scene associated with the downsampled three-dimensional object scene,
      wherein the hologram enhancer component generates respective square supports on the downsampled three-dimensional object scene that surround, and are larger in size than, respective sampled object points of the downsampled three-dimensional object scene and replaces the respective sampled object points with respective image blocks on the intermediate object wavefront recording plane and records respective wavefront patterns of the respective image blocks on the intermediate object wavefront recording plane,
wherein the respective image blocks correspond in size to the respective square supports of the respective sampled object points,
wherein the respective square supports comprise a first square support that surrounds a first sampled object point of the respective sampled object points and a second square support that surrounds a second sampled object point of the respective sampled object points, and a first side of the first square support adjoins a second side of the second square support that is adjacent to the first square support,
wherein the respective image blocks are larger in size than respective regions of the respective sampled object points that would be on the intermediate object wavefront recording plane had the respective sampled object points not been replaced with the respective image blocks, and
wherein the respective sampled object points cast respective windows of object waves on the virtual diffraction plane.

2. The system of claim 1, wherein the hologram enhancer component expands the intermediate object wavefront recording plane via use of the interpolation process to generate a full-parallax three-dimensional Fresnel hologram.

3. The system of claim 1, wherein the hologram enhancer component downsamples the three-dimensional object scene by a defined downsampling factor to generate the downsampled three-dimensional object scene.

4. The system of claim 3, wherein the hologram enhancer component identifies the defined downsampling factor based at least in part on at least one of a resolution of the three-dimensional object scene, a resolution of a holographic image representative of the three-dimensional object scene, a resolution of a display device, an amount of computational resources available to generate the three-dimensional hologram, or an amount of time available to generate the three-dimensional hologram.

5. The system of claim 1, wherein the hologram enhancer component derives the intermediate object wavefront recording plane from an accumulation of contributions from the respective sampled object points associated with the downsampled three-dimensional object scene, and wherein the respective sampled object points cast respective windows of fringe patterns on the virtual diffraction plane.

6. The system of claim 5, wherein the respective windows of fringe patterns associated with the respective sampled object points are non-overlapping in relation to each other, and wherein a first window of the respective windows has an edge boundary that adjoins an adjacent edge boundary of a second window of the respective windows.

7. The system of claim 6, wherein the respective image blocks are respective square image blocks, and the hologram enhancer component stores the respective wavefront patterns of the respective square image blocks associated with the respective sampled object points in a look-up table.

8. The system of claim 7, wherein the hologram enhancer component retrieves the respective wavefront patterns from the look-up table to facilitate generation of the intermediate object wavefront recording plane.

9. The system of claim 5, wherein the hologram enhancer component interpolates the intermediate object wavefront recording plane using two-dimensional interpolation conducted in a frequency space to generate an interpolative wavefront recording plane, and wherein the hologram enhancer component interpolates, with padding, a region of the first square support, in part, by duplicating pixels within the first square support with intensity and depth values of the first sampled object point to facilitate generation of a contribution of the first sampled object point.

10. The system of claim 1, wherein the hologram enhancer component decomposes the downsampled three-dimensional object scene into a set of polyphase image components, and wherein respective polyphase image components of the set of polyphase image components are translated by a defined displacement that results in respective sampling lattices of the respective polyphase image components being non-overlapping relative to each other.

11. The system of claim 10, wherein the hologram enhancer component generates respective intermediate object wavefront recording planes for the respective polyphase image components of the set of polyphase image components.

12. The system of claim 11, wherein the hologram enhancer component sums the respective intermediate object wavefront recording planes of the set of polyphase image components using at least one of a summing process or a blending process to generate modified intermediate object wavefront recording planes, and wherein respective wavefronts of the respective intermediate object wavefront recording planes do not overlap each other.

13. The system of claim 12, wherein the hologram enhancer component employs at least one of a graphics processing unit or a field-programmable gate array to sum the respective intermediate object wavefront recording planes of the set of polyphase image components using texture blending to generate the modified intermediate object wavefront recording planes.

14. The system of claim 12, wherein the hologram enhancer component expands the modified intermediate object wavefront recording planes to generate the three-dimensional hologram, and wherein the hologram enhancer component interpolates the modified intermediate object wavefront recording planes using two-dimensional interpolation conducted in a frequency space to facilitate expansion of the modified intermediate object wavefront recording planes to generate the three-dimensional hologram.

15. A method, comprising:
generating, by a system including at least one processor, an intermediate object wavefront recording plane on a virtual diffraction plane from a downsampled three-dimensional object scene,
wherein the intermediate object wavefront recording plane is within a defined distance of the downsampled three-dimensional object scene,
wherein respective square supports on the downsampled three-dimensional object scene are generated, and the respective square supports surround, and are larger in size than, respective sampled object points of the downsampled three-dimensional object scene,
wherein the respective square supports comprise a first square support and a second square support, and a first side of the first square support adjoins a second side of the second square support that is adjacent to the first square support,
wherein the respective sampled object points are replaced with respective image regions on the intermediate object wavefront recording plane and respective wavefront patterns of the respective image regions are recorded on the intermediate object wavefront recording plane, wherein the respective image regions are substantially same in size as the respective square supports of the respective sampled object points, wherein the respective image regions are larger in size than respective object point regions of the respective sampled object points that would be on the intermediate object wavefront recording plane in absence of the respective sampled object points having been replaced with the respective image regions, and wherein the respective sampled object points cast respective windows of fringe patterns on the virtual diffraction plane; and converting, by the system, the intermediate object wavefront recording plane to facilitate generating a three-dimensional hologram representing a three-dimensional object scene associated with the downsampled three-dimensional object scene.

16. The method of claim 15, further comprising:
downsampling, by the system, the three-dimensional object scene by a defined downsampling factor to generate the downsampled three-dimensional object scene.

17. The method of claim 15, further comprising:
generating, by the system, respective interpolative wavefronts associated with the respective sample points on respective virtual windows of the virtual diffraction plane.

18. The method of claim 15, further comprising:
deriving, by the system, the intermediate object wavefront recording plane from an accumulation of contributions from the respective sampled object points associated with the downsampled three-dimensional object scene.

19. The method of claim 18, further comprising:
interpolating, by the system, the intermediate object wavefront recording plane using two-dimensional interpolation conducted in a frequency space to generate an interpolative wavefront recording plane.

20. The method of claim 15, further comprising:
pre-computing, by the system, respective wavefront patterns of the respective image regions, wherein the respective image regions are respective square image regions.

21. The method of claim 20, further comprising:
storing, by the system, the respective wavefront patterns of the respective square image regions associated with the respective sampled object points in a look-up table.

22. The method of claim 21, further comprising:
obtaining, by the system, the respective wavefront patterns from the look-up table; and
generating, by the system, the intermediate object wavefront recording plane based at least in part on the respective wavefront patterns.

23. The method of claim 15, further comprising:
decomposing, by the system, the downsampled three-dimensional object scene into a subset of polyphase image components; and
generating, by the system, respective intermediate object wavefront recording planes for respective polyphase image components of the subset of polyphase image components.

24. The method of claim 23, further comprising:
summing, by the system, the respective intermediate object wavefront recording planes of the subset of polyphase image components to generate modified intermediate object wavefront recording planes;
interpolating, by the system, the modified intermediate object wavefront recording planes using two-dimensional interpolation conducted in a frequency space to facilitate expanding the modified intermediate object wavefront recording planes to generate the three-dimensional hologram; and
converting, by the system, the modified intermediate object wavefront recording planes to generate the three-dimensional hologram.

25. The method of claim 24, further comprising:
summing, by the system, the respective intermediate object wavefront recording planes of the subset of polyphase image components using texture blending to generate the modified intermediate object wavefront recording planes.

26. A non-transitory computer readable storage medium comprising computer executable instructions that, in response to execution, cause a system including a processor to perform operations, comprising:
generating an intermediate object wavefront recording plane on a virtual diffraction plane from a downsampled three-dimensional object scene,
wherein the intermediate object wavefront recording plane is within a defined distance of the downsampled three-dimensional object scene,
wherein respective square supports are generated on the downsampled three-dimensional object scene, and the respective square supports surround, and are larger in size than, respective sampled object points of the downsampled three-dimensional object scene,
wherein the respective square supports comprise a first square support and a second square support, and a first side of the first square support shares a border with a second side of the second square support that is adjacent to the first square support,
wherein the respective sampled object points are replaced with respective image regions on the intermediate object wavefront recording plane and respective wavefront patterns of the respective image regions are recorded on the intermediate object wavefront recording plane,
wherein the respective image regions correspond in size to the respective square supports of the respective sampled object points,
wherein the respective image regions are larger in size than respective object point image regions of the respective sampled object points that would have been on the intermediate object wavefront recording plane without replacement of the respective sampled object points with the respective image regions, and
wherein the respective sampled object points of the downsampled three-dimensional object scene cast respective windows of object waves on the virtual diffraction plane; and
expanding the intermediate object wavefront recording plane to facilitate generating a three-dimensional hologram representing a three-dimensional object scene associated with the downsampled three-dimensional object scene.

27. The non-transitory computer readable storage medium of claim 26, comprising computer executable instructions that, in response to execution, cause the system to perform operations, comprising:
interpolating the intermediate object wavefront recording plane using two-dimensional interpolation conducted in a frequency space to generate an interpolative object wavefront recording plane.

28. A system, comprising:

means for generating an intermediate object wavefront recording plane on a virtual diffraction plane from a downsampled three-dimensional object scene, wherein the means for generating comprises at least one processor device, wherein the intermediate object wavefront recording plane is within a defined distance of the downsampled three-dimensional object scene, wherein respective square supports are generated on the downsampled three-dimensional object scene, and the respective square supports surround, and are larger in size than, respective sampled object points of the downsampled three-dimensional object scene, wherein the respective square supports comprise a first square support and a second square support, and a first side of the first square support adjoins a second side of the second square support that is adjacent to the first square support, wherein the respective sampled object points are replaced with respective image blocks on the intermediate object wavefront recording plane and respective wavefront patterns of the respective image blocks are recorded on the intermediate object wavefront recording plane, wherein the respective image blocks correspond in size to the respective square supports of the respective sampled object points, wherein the respective image blocks are larger in size than respective regions of the respective sampled object points that would be on the intermediate object wavefront recording plane under a circumstance that the respective sampled object points had not been replaced with the respective image blocks, and wherein the respective sampled object points of the downsampled three-dimensional object scene cast respective windows of fringe patterns on the virtual diffraction plane; and means for expanding the intermediate object wavefront recording plane to facilitate generating a three-dimensional hologram representing a three-dimensional object scene associated with the downsampled three-dimensional object scene, wherein the means for expanding comprises the at least one processor device.

29. The system of claim 28, comprising:

means for interpolating the intermediate object wavefront recording plane using two-dimensional interpolation conducted in a frequency space to generate an interpolative object wavefront recording plane, wherein the means for interpolating comprises the at least one processor device.

* * * * *